United States Patent
Furukawa et al.

US 9,898,850 B2
Feb. 20, 2018

(54) SUPPORT AND COMPLEMENT DEVICE, SUPPORT AND COMPLEMENT METHOD, AND RECORDING MEDIUM FOR SPECIFYING CHARACTER MOTION OR ANIMATION

(75) Inventors: Hiromi Furukawa, Kitakyusyu (JP); Hiroyuki Sato, Kitakyusyu (JP)

(73) Assignee: BOND Co., Ltd., Fukuoka (JP)

( * ) Notice: Subject to any disclaimer, the term of this patent is extended or adjusted under 35 U.S.C. 154(b) by 529 days.

(21) Appl. No.: 13/983,100

(22) PCT Filed: Jan. 18, 2012

(86) PCT No.: PCT/JP2012/050937
§ 371 (c)(1),
(2), (4) Date: Sep. 18, 2013

(87) PCT Pub. No.: WO2012/105318
PCT Pub. Date: Aug. 9, 2012

(65) Prior Publication Data
US 2014/0002464 A1  Jan. 2, 2014

(30) Foreign Application Priority Data

Feb. 1, 2011 (JP) ................................. 2011-020101

(51) Int. Cl.
*G06T 13/80* (2011.01)
*G10L 21/10* (2013.01)
(Continued)

(52) U.S. Cl.
CPC .............. *G06T 13/80* (2013.01); *G06T 13/40* (2013.01); *G10L 21/10* (2013.01); *G10L 25/63* (2013.01)

(58) Field of Classification Search
CPC .......... G06T 13/40; G06T 13/80; G10L 21/10
(Continued)

(56) References Cited

U.S. PATENT DOCUMENTS

2003/0117485 A1* 6/2003 Mochizuki ............. G10L 17/26
  348/14.01
2004/0068408 A1* 4/2004 Qian ....................... G10L 21/06
  704/270
(Continued)

FOREIGN PATENT DOCUMENTS

JP  2001-275058  10/2001
JP  2003-248837   9/2003
(Continued)

OTHER PUBLICATIONS

International Search Report dated Feb. 14, 2012 filed in PCT/JP2012/050937.

*Primary Examiner* — Barry Drennan
*Assistant Examiner* — Terrell Robinson
(74) *Attorney, Agent, or Firm* — Rankin, Hill & Clark LLP

(57) ABSTRACT

A support and complement device etc., are provided, which appropriately generates the character's motion for content introduction in a simple manner. The user inputs a command to an input device, which specifies the character's motion used for content introduction. The support and complement device complements the command input operation. The content includes material data and language data. The language data includes voice data to be emitted by the character. A unit for recognizing emotions analyzes the material data and the language data, and deduces the emotion pattern to be expressed by the character. A unit for choosing commands determines the character's motion using the deduced emotion pattern, command, and voice data, and generates a motion command. A unit for reading out animation movies for user's check instructs a readout device to display a proposed animation movie generated by the unit for choosing commands, thereby allowing the user to review it.

14 Claims, 12 Drawing Sheets

(51) Int. Cl.
*G06T 13/40* (2011.01)
*G10L 25/63* (2013.01)

(58) Field of Classification Search
USPC .................................................. 345/474, 473
See application file for complete search history.

(56) References Cited

U.S. PATENT DOCUMENTS

| | | | | |
|---|---|---|---|---|
| 2004/0138959 A1* | 7/2004 | Hlavac | .................... | A63F 13/10 |
| | | | | 705/14.12 |
| 2009/0128567 A1* | 5/2009 | Shuster | .................... | G06T 13/40 |
| | | | | 345/473 |
| 2009/0153552 A1* | 6/2009 | Fidaleo | .............. | G06Q 30/0247 |
| | | | | 345/419 |
| 2010/0160044 A1* | 6/2010 | Satoh | ...................... | A63F 13/10 |
| | | | | 463/35 |
| 2010/0261146 A1* | 10/2010 | Kim | .................... | A63B 24/0006 |
| | | | | 434/252 |
| 2010/0302254 A1* | 12/2010 | Min | ...................... | G06F 17/214 |
| | | | | 345/473 |
| 2010/0312547 A1* | 12/2010 | Van Os | ................... | G06F 3/167 |
| | | | | 704/9 |
| 2011/0007079 A1* | 1/2011 | Perez | ...................... | G06F 3/011 |
| | | | | 345/473 |

FOREIGN PATENT DOCUMENTS

| | | |
|---|---|---|
| JP | 2005-266912 | 9/2005 |
| JP | 2008-046425 | 2/2008 |
| TW | 200625133 | 7/2006 |

* cited by examiner

SUPPORT AND COMPLEMENT DEVICE, SUPPORT AND COMPLEMENT METHOD, AND RECORDING MEDIUM FOR SPECIFYING CHARACTER MOTION OR ANIMATION

TECHNICAL FIELD

The present invention relates to a support and complement device for making movies, a support and complement method for making movies, and a recording medium. Particularly, it relates to a support and complement device for making movies or the like, configured to complement an input operation for inputting commands, each specifying a motion of a character for showing content.

BACKGROUND ART

In order to provide a character by means of computer graphics, a technique is described in Patent Literature 1, configured to allow a user to select a motion from a menu so as to create a character with a motion that corresponds to the item thus selected.

Also, in the field of games, a technique is described in Patent Literature 2, configured to allow the user of a game to communicate his emotion without displaying the expression of the user of a game who is emitting a voice. Such a technique allows the user of a game terminal to input voice data by means of a microphone. An image generating device classifies the voice data into reference voice data patterns, to select an expression from among a character's expression patterns stored beforehand, and to display the character with the expression thus selected.

CITATION LIST

Patent Literature

[Patent Literature 1]
  Japanese Patent Application Laid Open No. 2005-266912
[Patent Literature 2]
  Japanese Patent Application Laid Open No. 2003-248837

SUMMARY OF INVENTION

Issues to be Solved by Invention

However, as described in Patent Literature 1, before creating such a character, there is a need for movie makers to specify the motion of the character in detail. Accordingly, the movie makers could not create such a character without the help by professionals. Specifically, the professionals creates first each material data (photo data, video data, voice data, music data, text data, and so forth), and after it they converge the material data thus created into character data, thereby accomplish the character. Accordingly, once accomplished, the user cannot modify the character. Thus, it is difficult for the non-professional movie makers to appropriately create an animation movie with such a character in a simple manner.

Furthermore, a technique described in Patent Literature 2 is provided in order to transmit the voice emitted by the user of a game terminal such that the user keeps anonymity. That is to say, the character is no more than a substitution for the user.

Accordingly, it is a purpose of the present invention to provide a support and complement device or the like for making movies configured to allow the amateur user for animation movies to appropriately create a character's motion in a simple manner in order to introduce their content to viewers and listeners appropriately.

Solution of Issues

The first aspect in accordance with the present invention provides a support and complement device for making movies configured to complement an input operation for inputting commands, each specifying a motion of a character for showing content, wherein the content comprises material data and language data, and wherein the language data comprises voice and sound data which represents a voice and sound to be emitted by the character, and wherein the support and complement device comprises an emotion classification unit configured to analyze the material data and language data so as to deduce an emotion pattern to be expressed by the character; a unit for choosing commands configured to generate a motion command which represents a motion of the character; and a unit for reading out animation movies for a user's check, configured to instruct a readout device to play back, in a synchronized manner, the content and the motion of the character specified by the motion command, and wherein the unit for choosing commands is configured to judge, based on the voice and sound data, the motion of the character for emitting the voice and sound, and wherein the unit for choosing commands is further configured to judge, based on the motion pattern of the character stored in a unit of memory for facial expressions and poses, motions other than the aforementioned motion for emitting the voice and sound, and wherein the unit for choosing commands is further configured to judge the motion of the character also based on the emotion pattern thus deduced, and to generate the motion command.

The second aspect in accordance with the present invention provides the support and complement device for making movies of the first aspect, wherein the emotion classification unit is configured to analyze the material data and language data so as to select at least one emotion pattern from among a plurality of basic emotion patterns, and to set the basic emotion pattern and the level of the emotion pattern thus selected as the emotion pattern to be expressed by the character, and wherein, when the emotion classification unit selects a plurality of emotion patterns from among the aforementioned basic emotion patterns, the emotion classification unit is configured to determine main motion selecting processing based on the at least one basic emotion pattern selected by analyzing the language data, and to determine auxiliary motion selecting processing based on the other basic emotion patterns, and wherein the unit for choosing commands is configured to determine the motion based on a combination of the basic emotion patterns and their levels, and wherein, when the emotion classification unit selects a single basic emotion pattern from among the aforementioned basic emotion patterns, the unit for choosing commands is configured to determine the motion according to the basic emotion pattern thus selected and its level, and wherein, when the emotion classification unit selects a plurality of basic emotion patterns from among the aforementioned basic emotion patterns, the unit for choosing commands is configured to determine the motion based on the aforementioned main motion selecting processing at a reference weighting level that is higher than that of the aforementioned auxiliary motion selecting processing.

The third aspect in accordance with the present invention provides the support and complement device for making movies of the second aspect, wherein the aforementioned motion patterns include a default motion, and wherein the unit for choosing commands is configured to receive, as inputted data, a command for permitting to rewrite motion, which indicates whether or not the unit for choosing commands is to rewrite the motion based on the emotion pattern, and wherein, when the unit for choosing commands receives none from among the command, the material data, and the language data, the unit for choosing commands is configured to generate the motion command for the default motion, and wherein, when the unit for choosing commands does not receive an inputted command, but receives one of or otherwise both of the material data and the language data, the emotion classification unit is configured to analyze one of or otherwise both of the language data and the material data, so as to identify the emotion pattern, and to generate the motion command, and wherein, when the unit for choosing commands receives the inputted command, but receives neither the material data nor the language data, the unit for choosing commands is configured to generate the motion command for a motion specified by the inputted command, and wherein, when the unit for choosing commands receives the inputted command, and receives one of or otherwise both of the material data and the language data, and when the command for permitting to rewrite the motion is an instruction to disable the rewriting function, the unit for choosing commands is configured to generate the motion command for a motion specified by the inputted command, and wherein, when the unit for choosing commands receives the command, and receives one of or otherwise both of the material data and the language data, and when the command for permitting to rewrite the motion is an instruction to enable the rewriting function, the emotion classification unit is configured to analyze one of or otherwise both of the language data and the material data so as to identify the emotion pattern, and the unit for choosing commands is configured to rewrite the motion specified by the inputted command, so as to generate the motion command.

The fourth aspect in accordance with the present invention provides the support and complement device for making movies of any one of the first through the third aspects, further comprising a unit of memory for correction input history configured to store a correction history which represents correction of the motion command performed in a previous step, wherein the unit for choosing commands is configured to generate the motion command also using the correction input history, and wherein the unit for choosing commands is configured to generate the motion command according to an emotion level which exhibits its maximum level at a time point at which the motion pattern identified by the emotion classification unit transits to a next motion pattern in a scenario data time scale, also or otherwise at a time point at which the inputted command transits to a next inputted command in the scenario data time scale, and which decreases from its maximum level as time advances in the scenario data time scale.

The fifth aspect in accordance with the present invention provides the support and complement device for making movies of any one of the first through the fourth aspects, further comprising a unit for integrating data for making a scenario configured to generate scenario data including the motion command; and a unit for integrating data for making animation movies configured to generate animation movie data by reading out the content and the character's motion specified by the motion command in a synchronized manner, and wherein a transferred animation data integration device is configured to receive the scenario data in addition to the content and the character pictures, and to play back, in a synchronized manner, the content and the character's motion specified by the scenario data, and wherein a transferred animation movies output device is configured to receive the animation movie data, and to play back the animation movie data thus received.

The sixth aspect in accordance with the present invention provides the support and complement device for making movies of any one of the first through the fifth aspects, wherein a plurality of characters are employed, and wherein, when at least one character is operated, the emotion classification unit is configured to rewrite the emotion patterns of the other characters and also or otherwise their levels based on the emotion pattern of the character thus operated.

The seventh aspect in accordance with the present invention provides a support and complement method for making movies used by a support and complement device for making movies for complementing an input operation for inputting commands, each specifying a motion of a character for showing content, wherein the content comprises material data and language data, and wherein the language data comprises voice and sound data which represents a voice and sound to be emitted by the character, and wherein the support and complement device comprises an emotion classification unit; a unit for choosing commands; and a unit for reading out animation movies for a user's check, and wherein the support and complement method comprises emotion pattern deducing in which the emotion classification unit analyzes the material data and language data, and deduces an emotion pattern to be expressed by the character; command choosing in which the unit for choosing commands judges, based on the voice and sound data, the motion of the character for emitting the voice and sound, and judges, based on the motion pattern of the character stored in a unit of memory for facial expressions and poses, motions other than the aforementioned motion for emitting the voice and sound, and the unit for choosing commands further judges the motion of the character also based on the emotion pattern thus deduced, and generates the motion command; reading out animation movies for a user's check in which the unit for reading out animation movies for a user's check instructs a readout device to play back, in a synchronized manner, the content and the motion of the character specified by the motion command; and command processing in which, when the command input to the support and complement device is added or changed, the support and complement device performs processing for the command thus added or changed.

The eighth aspect in accordance with the present invention provides a computer readable recording medium configured to record a computer program for instructing a computer to perform the support and complement method of the seventh aspect.

It should be noted that, with the present invention, such an arrangement may be configured to generate the camera work data, the light effect data, the background color data, the sound effect data, and so forth, in addition to the character's motion.

Also, the present invention may be regarded as a program configured to instruct a computer to provide the support and complement method according to the seventh aspect.

Advantageous Effects of Invention

With the present invention, the unit of memory for facial expressions and poses is configured to store beforehand the character's motion patterns created by the specialist. The user of the support and complement device inputs the command so as to specify the character's motion. The support and complement device determines the character's motion based on the emotion pattern obtained by means of analysis of the content in addition to the command. Such an arrangement allows the user to determine the character's motion in a simple manner. Furthermore, such an arrangement allows the user to correct the motion which the character is provided with while checking the determined motion multiple times in a simple manner. Thus, such an arrangement allows the character to express an emotion pattern suitable for the content. When an additional command is input, or otherwise when the command is changed, such an arrangement performs data processing for the command thus added or changed. Thus, with the present invention, such an arrangement allows the content to be appropriately introduced to the viewers and listeners in a simple manner using the character.

A conventional arrangement disclosed in Patent Literature 1 is configured to provide the character's motion only according to a command. With such a conventional arrangement, motions of the character other than the specified motions are regarded as undesirable by the user. Also, an arrangement described in Patent Literature 2 is configured to allow the user to input the emotion data. However, Patent Literature 2 does not describe an arrangement configured to modify the emotion data. When the user does not specify an emotion data pattern, the voice data is classified into emotion data patterns. The data to be analyzed is limited to the voice data which has a direct effect on the character's motion. This is because, with the technique described in Patent Literature 2, the character acts as a substitute for the user, and motions of the character other than the specified motions are regarded as undesirable by the user. As described above, an arrangement according to the background techniques is configured to provide the character's motion that is not contrary to the intention of the user, which provides only a passive operation. That is to say, an operation in which the specified motion is automatically changed becomes an operation that is inconsistent with the user, i.e., an undesirable operation. Thus, neither Patent Literature 1 nor Patent Literature 2 describe an arrangement in which, after the motion is specified, the motion thus specified is changed.

In contrast, it is a purpose of the present invention to provide a technique for introducing content most properly to viewers and listeners. The character's motion is provided in order to support the most proper introduction of the content. That is to say, the purpose of the present invention differs from that of the background techniques. Thus, such an arrangement is not restricted to an arrangement in which the character is required to perform a motion according to the will of the user, unlike the background techniques. Rather, such an arrangement is preferably configured to adjust the character's motion such that it becomes most suitable for the purpose of the content introduction, which meets the user's genuine requirements. With the present invention, the motion patterns are included in the system beforehand by the specialist for making movies. By inputting the command, such an arrangement allows the user to instruct the character to perform a motion in a simple manner using the motion patterns thus prepared. Furthermore, an arrangement according to the present invention is configured to automatically generate the character's motion to be most suitable for the content. This allows the most suitable character's motion to be automatically generated. Furthermore, the unit for reading out animation movies for user's check suggests a proposed character's motion thus automatically generated. Thus, by replacing such a command with a more suitable command, such an arrangement allows the character's motion to be adjusted such that it further reflects the user's thinking. In a case in which the material data is created by the specialist as ordered material data, the user receives the material data as completed data. With such an arrangement, it is difficult for the user to adjust the material data such that it reflects the user's thinking from the viewpoint of the overall consistency. Unlike the background techniques, an arrangement according to the present invention is not an arrangement configured to provide a passive operation in which the character's motion is determined simply according to what is not contrary to the intention of the user. Rather, the present invention provides an active control operation which allows the most suitable command to be input such that it matches the purpose, i.e., the introduction of the content most properly.

In particular, with the present invention, the support and complement device only requires the user to prepare the image data, video material data, music material data, text data, and the like, to provide a character with an emotion pattern extracted from this material data and so forth, which is configured to introduce the content most properly to the viewers and listeners. Thus, such an arrangement allows the user to introduce the content or the like most properly such that the viewers and listeners readily have empathy for the user's emotion even if the user is a beginner to make movies.

With the second aspect of the present invention, when multiple basic emotion patterns are selected as a result of analysis of the material data and the language data, the voice data, which is the language data including information close to the character's motion, is used at a higher priority level to determine the character's motion. Thus, even if the content is to be transmitted with multiple basic emotion patterns, such an arrangement allows the character's motion to be determined with a higher priority based on the information close to the character's motion.

With the third aspect of the present invention, such an arrangement allows the character's motion to be automatically generated even if no command is input. Thus, such an arrangement is capable of performing a control operation for the character's motion without involving the command even if the command is canceled. Furthermore, such an arrangement is also capable of instructing the character to perform a motion in accordance with a specification according to a command input by the user.

With the fourth aspect of the present invention, the effect on the emotion to be expressed can be diminished as time for showing movies elapses. Thus, such an arrangement provides a natural expression of the emotion.

With the fifth aspect of the present invention, in a case in which a receiving-side device has a data processing capacity for the distributed scenario data, as with the transferred animation data integration device, the receiving-side device performs data processing on the scenario data so as to play back the content. Thus, such an arrangement allows the scenario data to be integrated and played back locally at information receivers. Examples of such operations include an operation in which a character suitable for the location of the receiving-side device is selected, and the character thus selected is instructed to perform a motion. On the other hand, in a case in which the receiving-side device is configured as a terminal device having only a function of playing back animation movie data, as with the transferred animation movies output device, the support and complement device generates the animation movie data, and the receiving-side device plays back the animation movie data thus generated. Such an arrangement allows the content to be introduced even if the receiving-side device has insufficient data processing capacity.

With the sixth aspect of the present invention, when a given character performs a motion, such an arrangement is capable of instructing the other characters to perform their motions as if they had empathy for the aforementioned given character. That is to say, the character performing a motion expresses its emotion, i.e., acts as a speaker. The other characters each act as a listener who listens to the expression. With the sixth aspect of the present invention, when the emotion expressed by the speaker character is the same as the emotion of the listener character, the listener character again expresses the same emotion at an emotion level that is elevated from the current emotion level. On the other hand, when the emotion expressed by the speaker character differs from the emotion of the listener character, a different emotion pattern is extracted, and the listener character expresses the emotion pattern thus extracted. Thus, such an arrangement allows the multiple characters to express their emotion patterns in a unified manner even in a case in which the emotion currently expressed diminishes over time as described in the fourth aspect. Such an arrangement allows the viewers and listeners to assimilate the expression of the listener character, and to watch the content with empathy for the listener character. Thus, such an arrangement provides a natural transmission of the emotion from listener character to viewers.

DESCRIPTION OF EMBODIMENTS

Description will be made with reference to the drawings regarding an arrangement configured to provide the present invention. It should be noted that the present invention is by no means intended to be restricted to the following embodiments.

[Embodiment 1]

Figure 1:
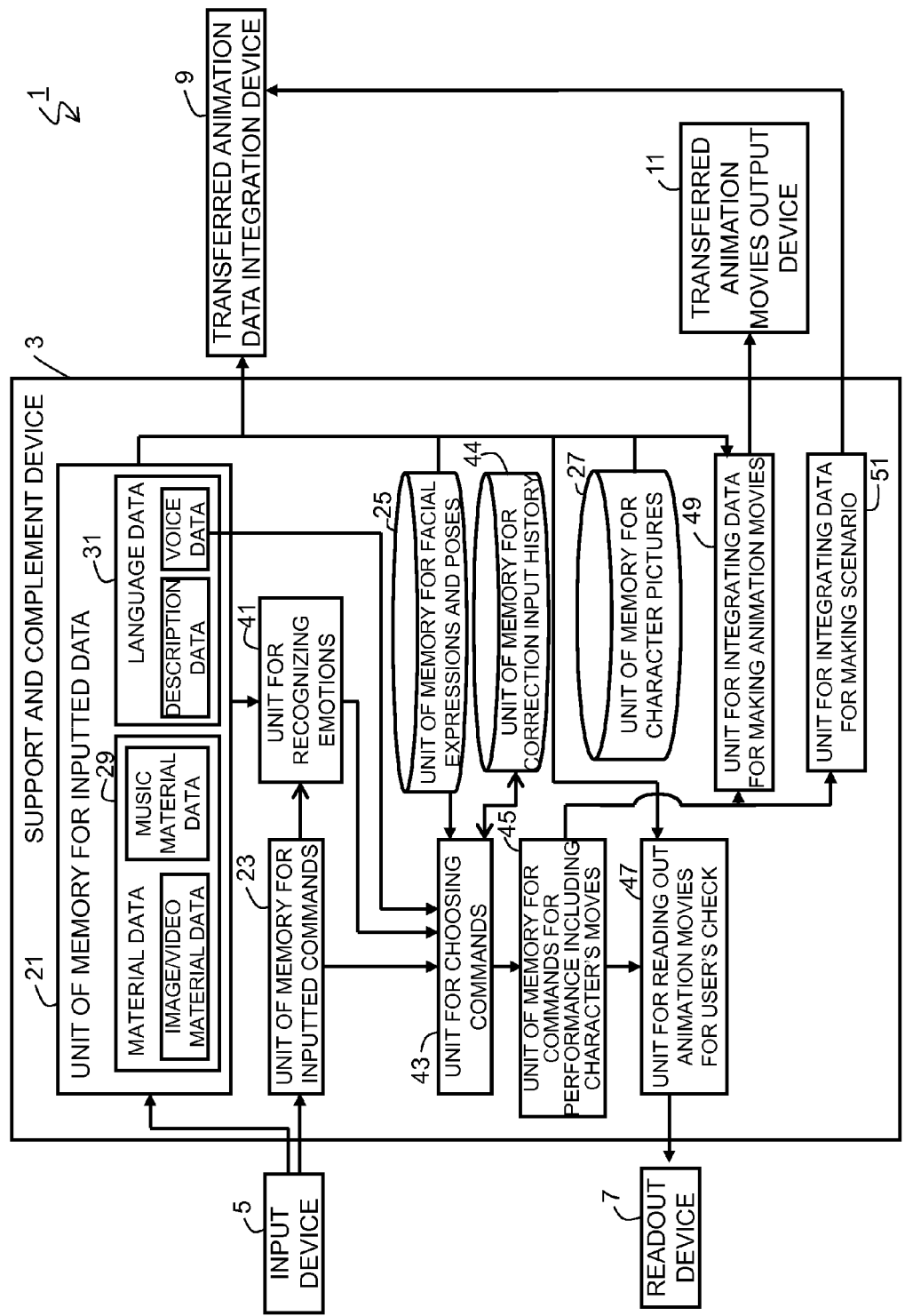
FIG. 1 is a schematic block diagram for describing a configuration and an operation of a system 1 for making animation movies according to an embodiment 1 of the present invention.

FIG. 1 is a schematic block diagram for describing a configuration and an operation of a system 1 for making animation movies according to an embodiment of the present invention. The system 1 for making animation movies includes an support and complement device 3 (which is an example of the "support and complement device" in the claims), an input device 5, a readout device 7 (which is an example of the "readout device" in the claims), a transferred animation data integration device 9, and a transferred animation movies output device 11. The support and complement device 3 is configured to complement the input operation for a specification command which specifies a motion of a character (which is a subject to move physically such as a character, an animal, or the like) in order to introduce content. The input device 5 is configured to allow the user who operates the support and complement device 3 to perform an input operation for content and a specification command. The readout device 7 is configured to display a proposed animation movie generated by the support and complement device 3. The transferred animation data integration device 9 and the transferred animation movies output device 11 are configured to play back the animation movie generated by the support and complement device 3.

The support and complement device 3 includes a unit 21 of memory for inputted data, a unit 23 of memory for inputted commands, a unit 25 of memory for facial expressions and poses (which is an example of the "unit of memory for facial expressions and poses" in the claims), and a unit 27 of memory for character pictures. The unit 21 of memory for inputted data is configured to store content input via the input device 5. Here, the content includes material data 29 (visual and sound data) and language data (typed language or vocal sound data). The material data 29 is configured to provide a series of information to be transmitted to the viewers and listeners of the transferred animation data integration device 9 and the transferred animation movies output device 11. The material data includes image/video material data and music data. The language data 31 includes voice (which is an example of the "voice data" in the present invention) to be emitted by the character, and descriptions by means of language. The unit 23 of memory for inputted commands is configured to store a specification command input via the input device 5. The unit 25 of memory for facial expressions and poses is configured to store the motion patterns created for the character beforehand by a professional movies makers, in the form of included data. The unit 27 of memory for character pictures is configured to store the images of the character.

The support and complement device 3 further includes a unit 41 for recognizing emotions (which is an example of the "unit for recognizing emotions" in the claims), a unit 43 for choosing commands (which is an example of the "unit for choosing commands" in the claims), a unit 45 of memory for commands for performance including character's moves, and a unit 47 for reading out animation movies for user's check (which is an example of the "unit for reading out animation movies for user's check" in the claims). The unit 41 for recognizing emotions is configured to analyze the specification command stored in the unit 23 of memory for inputted commands, the material data 29, and the language data 31, and to deduce the emotion pattern to be expressed by the character. With reference to the motion pattern stored in the unit 25 of memory for facial expressions and poses, the unit 43 for choosing commands is configured to generate a motion command which specifies a motion to be performed by the character. It should be noted that such an arrangement is configured to allow a command for permitting to rewrite character's motion, facial expressions or other performance to be input via the input device. This command is an instruction for the unit 43 for choosing commands, which enables or otherwise disables the modification function based on the emotion pattern. When the command disables the modification command to rewrite character's motion, facial expressions or other performance, the unit 43 for choosing commands is configured to instruct the character to perform a default character's motion, facial expressions or other performance, or otherwise a motion specified by the specification command. When this command enables the modification command, such an arrangement is configured to perform a modification operation as follows. The unit 47 for reading out animation movies for user's check is configured to instruct the readout device 7 to synchronously play back content and the character with motion according to the motion command based on the character's image stored in the unit 27 of memory for character pictures. Such an arrangement allows the user of the support and complement device 3 to perform addition of a specification command, modification of such a specification command, deletion of such a specification command, and so forth, with reference to the display provided by the readout device 7, thereby providing a more suitable motion of a character in a simple manner.

The support and complement device 3 further includes unit 51 for integrating data for making scenario (which is an example of the "unit for integrating data for making scenario" in the claims), and a unit 49 for integrating data for making animation movies (which is an example of the "unit for integrating data for making animation movies" in the claims). The unit 51 for integrating data for making scenario is configured to generate scenario data including a motion command. The unit 49 for integrating data for making animation movies is configured to synchronously play back content and a character with motion specified by the motion command, thereby generating movie data. The transferred animation data integration device 9 is configured as a device which is capable of performing a certain level of information processing, such as a personal computer (PC). Such an arrangement is suitable for content distribution in a case in which the information processing is performed by each terminal device based on the scenario data. Thus, such an arrangement allows an animation movie to be played back in accordance with its local time and its local position. In contrast, the transferred animation movies output device 11 is configured only as a monitor or the like, having only a function of playing back movie data. The transferred animation movies output device 11 is capable of playing back movie data. However, using only the distributed scenario data cannot provide the distribution of an animation movie via the transferred animation movies output device 11. Accordingly, the support and complement device 3 uses the movie data generated by the unit 49 for integrating data for making animation movies to provide the distribution of an animation movie for the transferred animation movies output device 11.

Figure 2:
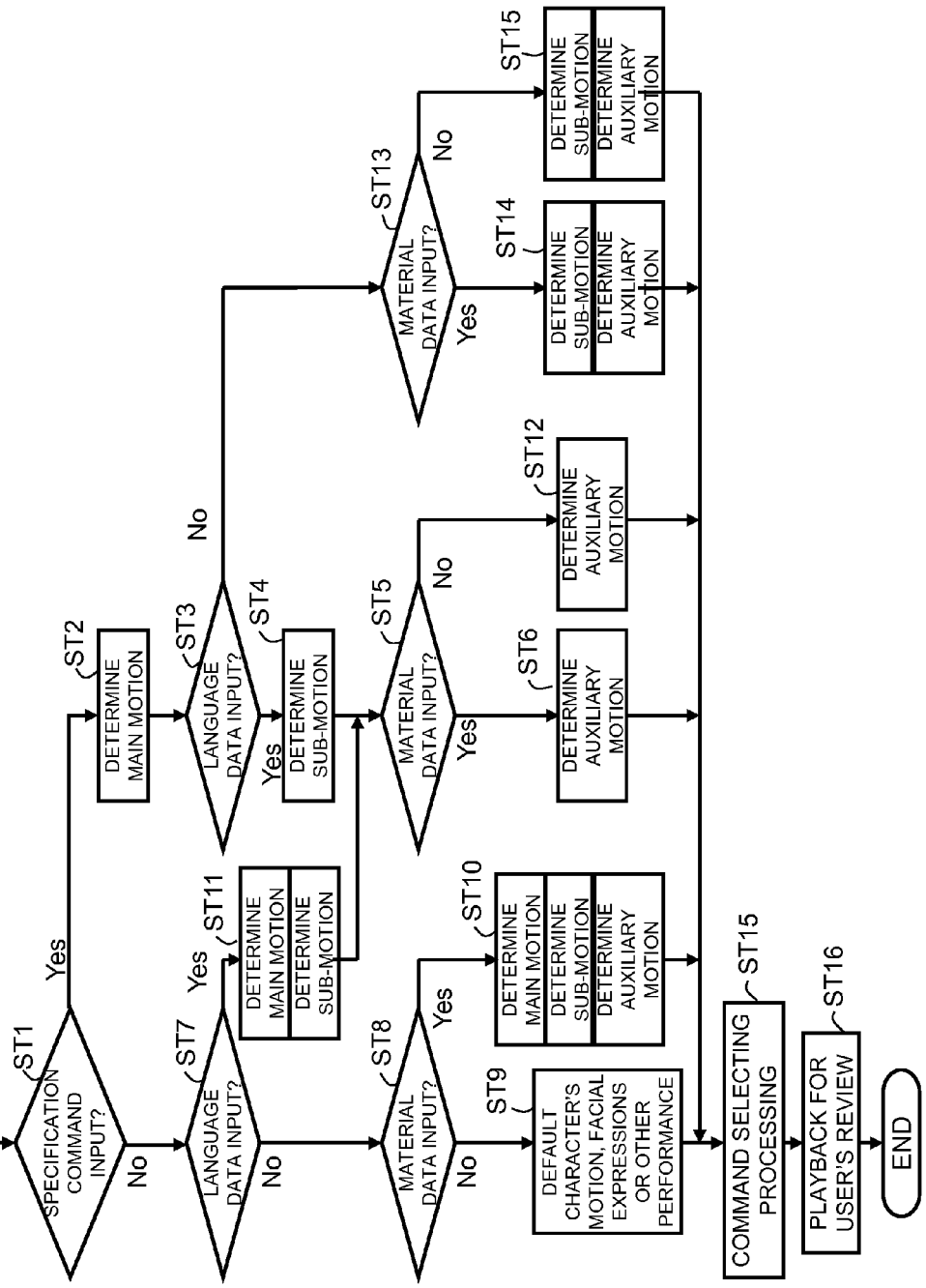
FIG. 2 is a flowchart showing the schematic operations of a unit 41 for recognizing emotions, a unit 43 for choosing commands, and a unit 47 for reading out animation movies for user's check.

Next, it is described hereafter, with reference to FIG. 2, regarding the schematic operations of the unit 41 for recognizing emotions, the unit 43 for choosing commands, and the unit 47 for reading out animation movies for user's check, which are each shown in FIG. 1. The unit 41 for recognizing emotions shown in FIG. 1 judges whether or not a specification command has been input (Step ST1). When a specification command is input, a prior pose or motion of character (a main motion; at least one basic emotion pattern to be expressed with the highest weighting ratio) is determined according to the specification command thus input (Step ST2). Subsequently, whether or not the language data 31 has been input is checked (Step ST3). When the language data 31 is input, a second prior pose or motion of character (a sub-motion; at least one basic emotion pattern to be expressed with the second-highest weighting ratio, next to that of the main motion) is determined based on the language data 31 (Step ST4). Subsequently, whether or not the material data 29 has been input is checked (Step ST5). When the material data 29 is input, an auxiliary motion (at least one basic emotion pattern to be expressed with the third-highest weighing ratio, next to that of the sub-motion) is determined based on the material data 29. That is to say, when all of the specification command, the language data 31, and the material data 29 are input, at least one basic emotion pattern is determined for each of the specification command, the language data 31, and the material data 29. The character's motion is determined based on the specification command, the language data, and the material data, with weighting ratios in descending order of the specification command, the language data 31, and the material data 29.

When none from among the specification command, the language data 31, and the material data 29 is input (in a case of "NO" in Step ST1, ST7, or ST8), a default character's motion, facial expressions or other performance is selected (Step ST9). The default character's motion, facial expressions or other performance is prepared as a predetermined motion pattern stored beforehand in the unit 25 of memory for facial expressions and poses. When neither the specification command nor the language data 31 is input, and when only the material data 29 is input, all of the main motion, the sub-motion, and the auxiliary motion are determined based on the material data 29 alone (Step ST10). When no specification command is input, and only the language data 31 is input, the main motion and the sub-motion are determined based on the language data 31 alone (Step ST11). Next, the flow proceeds to the judgment step in Step ST5. In this step, when no material data 29 is input, the auxiliary motion is determined based on the specification command and/or the language data 31 (Step ST12). When the specification command is input, and the language data 31 is not input, and when the material data 29 is input, both the sub-motion and the auxiliary motion are determined based on the material data 29 (Step ST14). When the specification command is input, and the language data 31 is not input, and when the material data 29 is not input, both the sub-motion and the auxiliary motion are determined based on the specification command (Step ST15). The unit 43 for choosing commands generates the motion command based on the default character's motion, facial expressions or other performance, the main motion, the sub-motion, or the auxiliary motion thus determined (Step ST15). The unit 47 for reading out animation movies for user's check instructs the readout device 7 to display the proposed animation movie. Such an arrangement allows the user to perform an input operation for the specification command and so forth while referring to the proposed animation movie. The support and complement device 3 performs motion command generating processing and the like according to the specification command and the like thus modified.

Next, specific description will be made with reference to FIGS. 3 through 6 regarding the operations of the unit 41 for recognizing emotions and the unit 43 for choosing commands shown in FIG. 1. The content includes the material data 29 and the language data 31. If only the material data 29 and the language data 31 are distributed to the viewers or listeners, the viewers and listeners receive such data as just information. By instructing the character to perform a motion expressing emotion according to the content, such an arrangement encourages the viewers and listeners to make evaluations and judgments, thereby stimulating the viewers' and listeners' emotions. The present invention provides an arrangement configured to instruct the character to perform a motion so as to support the viewers and listeners making evaluations and judgments with respect to the content, unlike the background techniques configured to transmit the content in a one-way manner.

The unit 25 of memory for facial expressions and poses shown in FIG. 1 is configured to store the motion patterns (an example of the "motion pattern" in the claims) for each part (e.g., the eyebrows, eyes, shoulders, hands, and so forth) of the character. Examples of such motion data include a motion in which the character raises both of its hands diagonally. Furthermore, the unit 25 of memory for facial expressions and poses is configured to store illumination data which specifies the hue, brightness, and sharpness of the illumination light, ambient light, and so forth. Examples of such illumination data include "ambient light 20% (white)". Moreover, the unit 25 of memory for facial expressions and poses is configured to store the camera work data which specifies the position, time, and angle of the camera. Examples of the camera work data include those of "the upper body". It should be noted that the unit 25 of memory for facial expressions and poses may be configured to store other kinds of data.

Figure 3:
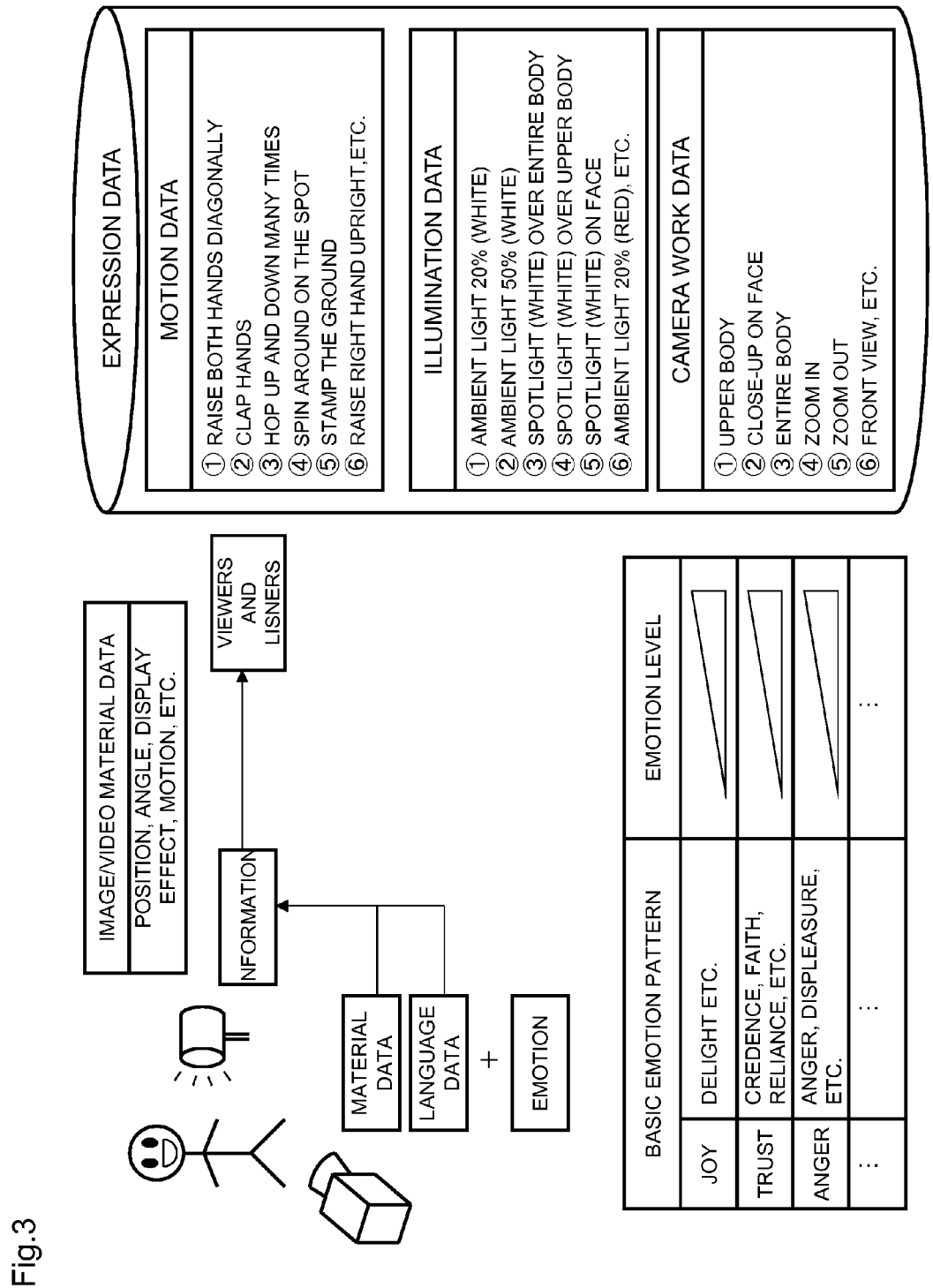
FIG. 3 is a diagram showing the relation between a combination of the basic emotion pattern and an emotion level determined by the unit 41 for recognizing emotions shown in FIG. 1, and a unit 25 of memory for facial expressions and poses.

Description below will be made with reference to FIG. 3 regarding the basic emotion pattern (which is an example of the "basic emotion pattern" in the claims), and the emotion level (which is an example of the "level of the basic emotion pattern" in the claims). Examples of the basic emotion patterns include: joy (delight and so forth), trust (credence, faith, reliance, and so forth), and anger (displeasure and so forth). The emotion level is set for each basic emotion pattern. The unit 41 for recognizing emotions is configured to analyze the specification command and the content, to select at least one basic emotion pattern, and to analyze the emotion level for each basic emotion pattern thus selected. A combination of the basic emotion pattern and the emotion level is associated with at least one of the data from among the aforementioned multiple data such as the motion data, illumination data, camera work data, and the like, stored in the unit 25 of memory for facial expressions and poses. For example, when the emotion level associated with the basic emotion pattern "joy" is low, such an arrangement selects the motion data which specifies (2) "CLAP HANDS", the illumination data which specifies (2) "AMBIENT LIGHT 50% (WHITE)" and (3) "SPOTLIGHT (WHITE) OVER ENTIRE BODY", and the camera work data which specifies (3) "ENTIRE BODY" and (6) "FRONT VIEW". When the emotion level rises, such an arrangement selects the motion data which specifies (1) "RAISE BOTH HANDS DIAGONALLY" and (3) "HOP UP AND DOWN MANY TIMES", the illumination data which specifies (1) "AMBIENT LIGHT 20% (WHITE)" and (3) "SPOTLIGHT (WHITE) OVER ENTIRE BODY", and the camera work data which specifies (2) "CLOSE-UP ON FACE" and (6) "FRONT VIEW". When the emotion level further rises, such an arrangement selects the motion data which specifies (2) "CLAP HANDS", (3) "HOP UP AND DOWN MANY TIMES", and (6) "RAISE RIGHT HAND UPRIGHT", the illumination data which specifies (2) "AMBIENT LIGHT 50% (WHITE)", (3) "SPOTLIGHT (WHITE) OVER ENTIRE BODY", and (4) "SPOTLIGHT (WHITE) OVER UPPER BODY", and the camera work data which specifies (2) "CLOSE-UP ON FACE", (4) "ZOOM IN", and (6) "FRONT VIEW".

Description below will be made with reference to FIG. 4 regarding the generation of the motion pattern. With regard to the motion to be performed by the character when the character emits a voice, such as a motion of the character's mouth, the unit 43 for choosing commands is configured to determine such a motion based on the voice data of the language data 31 included in the content. This provides a natural motion when voice is emitted. With regard to the motions other than the voice emission motion, the unit 43 for choosing commands is configured to determine such a motion based on the specification command and the character's motion patterns stored in the unit 25 of memory for facial expressions and poses. Furthermore, the unit 43 for choosing commands is configured to determine the character's motion also based on the emotion pattern deduced by the unit 41 for recognizing emotions, so as to generate the motion command.

For example, when the language data includes a statement, "It is a lot of fun", such an arrangement selects, by means of morphological analysis, only a single basic emotion pattern (emotion C) which specifies "joy" based on the word "fun". This is a simple expression as shown in FIG. 4. As an expression, for this example, it is enough to determine the motion of the character based on a single basic emotion pattern alone.

However, unlike the background techniques, an arrangement according to the present invention is configured to allow multiple basic emotion patterns to be automatically selected. That is to say, in some cases, such an arrangement selects a positive emotion pattern such as "joy", "trust", or the like, and a negative emotion pattern such as "anger" at the same time. This is a mixed expression as shown in FIG. 4. For example, when the description specifies, "I responded with a smile, but I couldn't hold back my anger at the rudeness", such an arrangement selects a positive emotion A based on the morphological analysis of one phrase part, "I responded with a smile". In this case, there is no information with respect to the emotion level, and accordingly, the emotion level is set to an average level, for example. On the other hand, such an arrangement selects a negative emotion B as a result of morphological analysis of the other phrase part, "but I couldn't hold back my anger at the rudeness". In this case, such an arrangement judges that the corresponding emotion level is high. As described above, when multiple basic emotion patterns are selected, such an arrangement performs further word analysis so as to judge a basic emotion pattern to be set to a higher priority level. In this case, attention is directed to the conjunction "but", and attention is directed to the difference between "smile" which is an expression that specifies the character's appearance and "anger" which is an expression that specifies the character's inner thoughts. As a result, such an arrangement judges that the emotion A is the main emotion, and that the emotion B is an auxiliary emotion. Thus, the unit 43 for choosing commands is configured to determine a motion that corresponds to a combination of the emotion A and its emotion level with a weighting ratio that is higher than that of a combination of the emotion B and its emotion level. As shown in FIG. 5, the motion (pose) and time (motion speed) are determined for each part of the character according to the weighting ratios. Furthermore, the data that specifies the motions of the character's mouth and so forth is modified as necessary. In addition to the character's motion, the illumination data, the camera work data, and so forth, are determined in the same way as described above.

Figure 4:
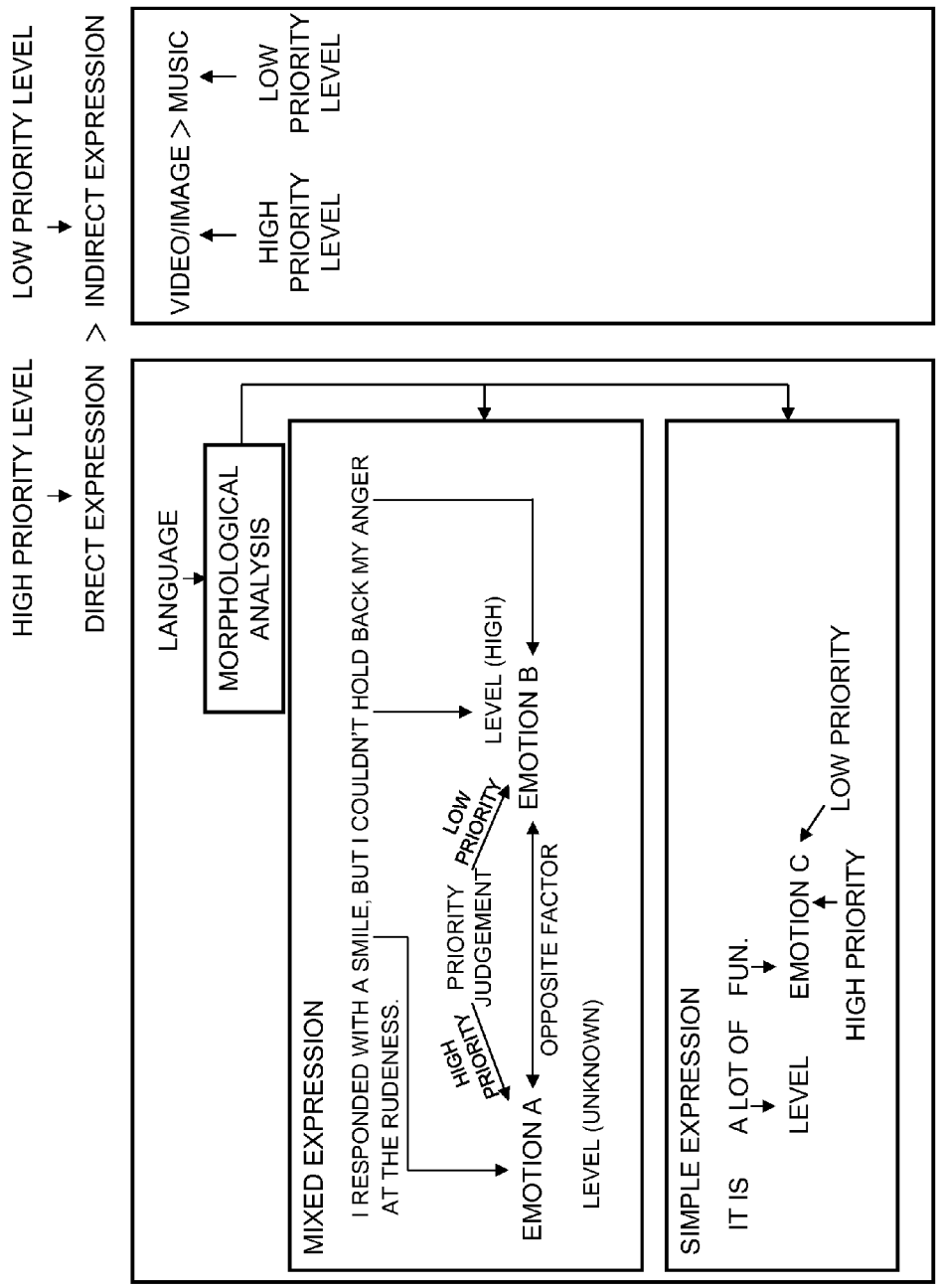
FIG. 4 is a diagram showing a combination of the basic emotion pattern and an emotion level determined by the unit for recognizing emotions shown in FIG. 1, and the determination of the relation between the basic emotion patterns and the emotion levels.
Figure 5:
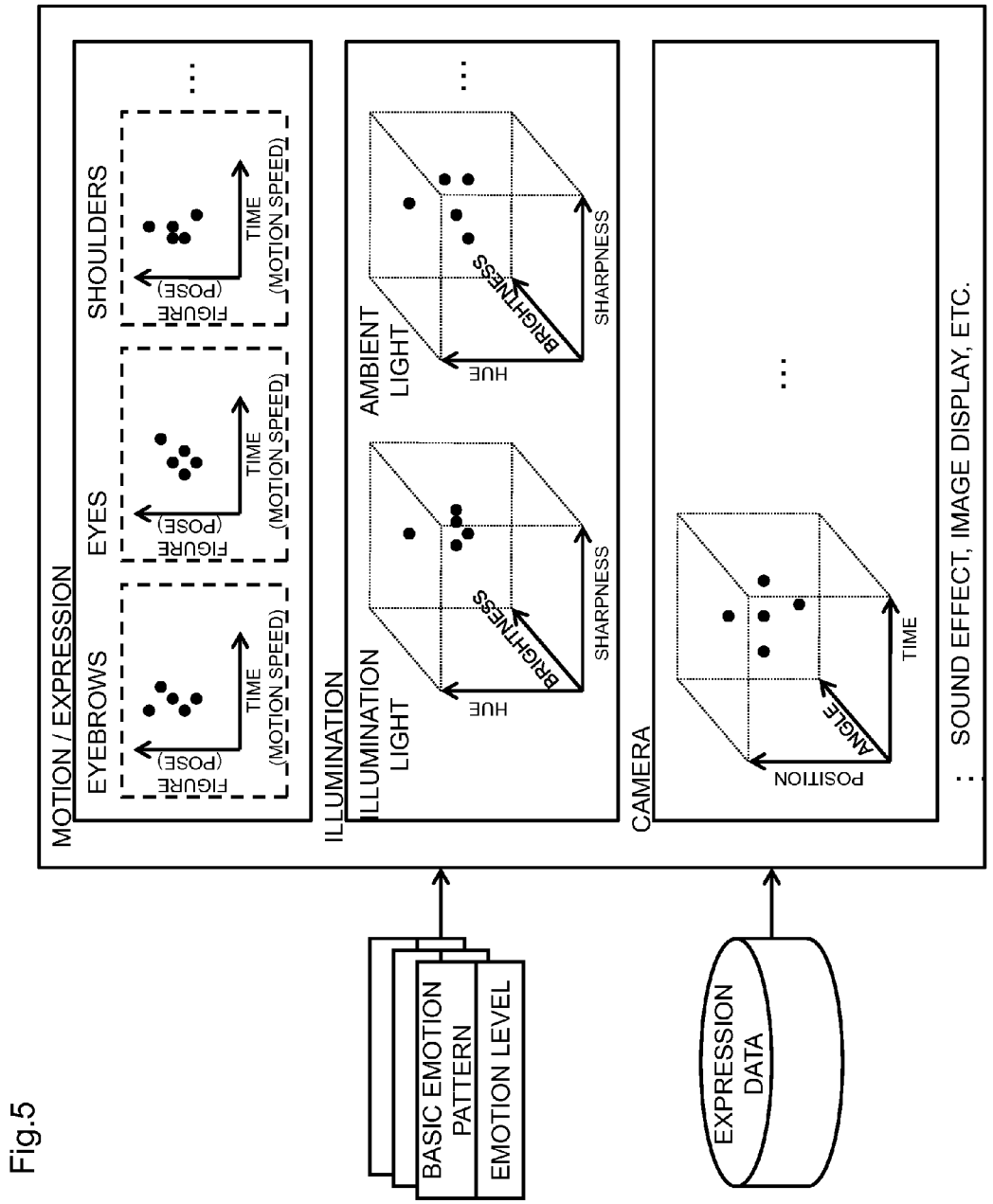
FIG. 5 is a diagram showing the determination operation of the unit 43 for choosing commands shown in FIG. 1 for determining the character's motion.

Description above has been made with reference to FIG. 4 regarding the main motion and the auxiliary motion deduced from the same language data 31. With the present embodiment, as shown in FIG. 2, the character's motion is determined based on the specification command, the language data 31, and the material data 29, with a corresponding priority level (i.e., with a corresponding weighting ratio) in descending order of the specification command, the language data 31, and the material data 29. Thus, such an arrangement allows the user to specify the character's motion based on the specification command, the language data 31, and the material data 29, according to the degree of directness with the character's motion, while conforming to the introduction of the content.

Figure 6:
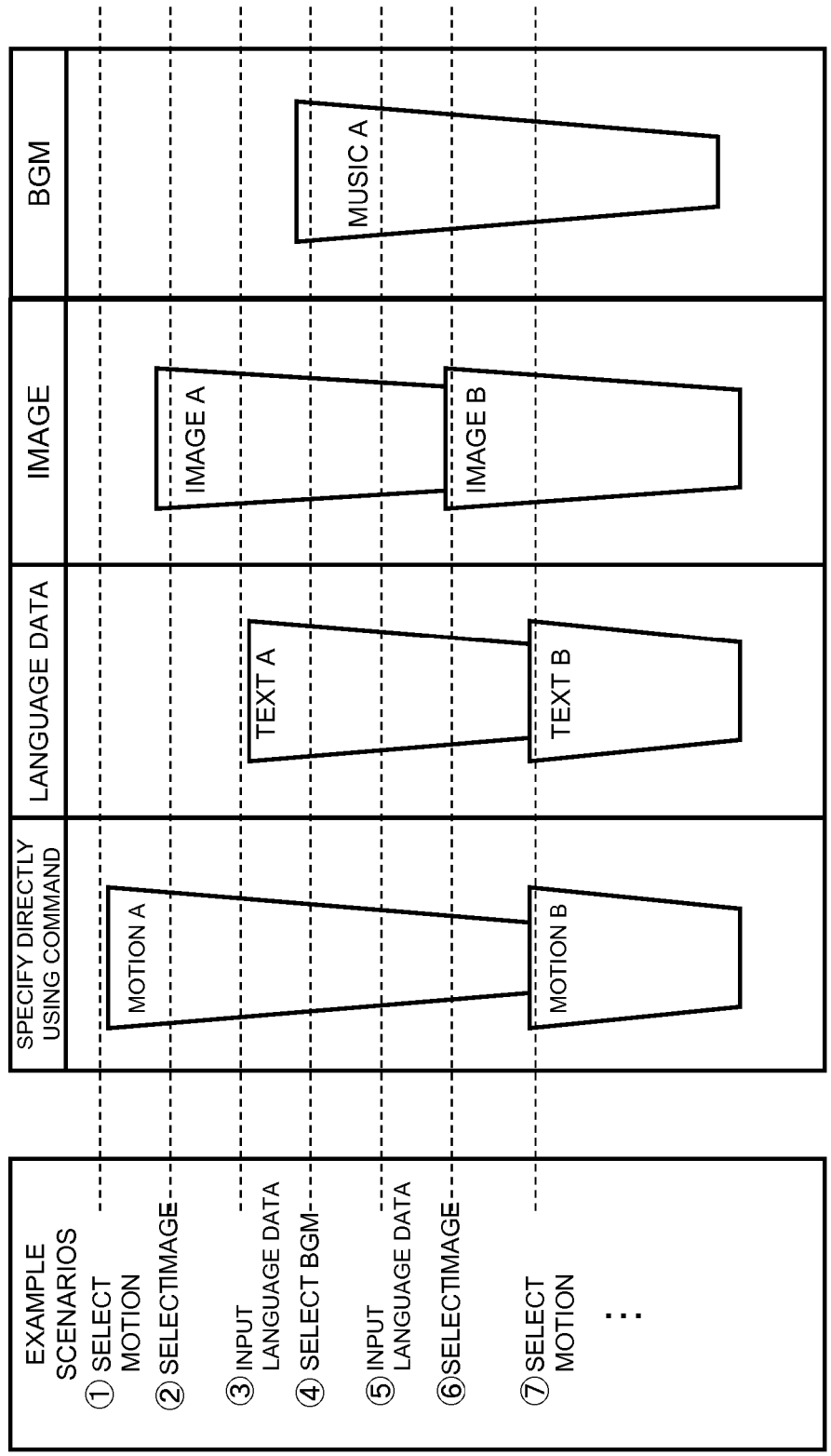
FIG. 6 is a diagram showing the effect of the emotion pattern with respect to the unit 43 for choosing commands shown in FIG. 1.
Figure 7:
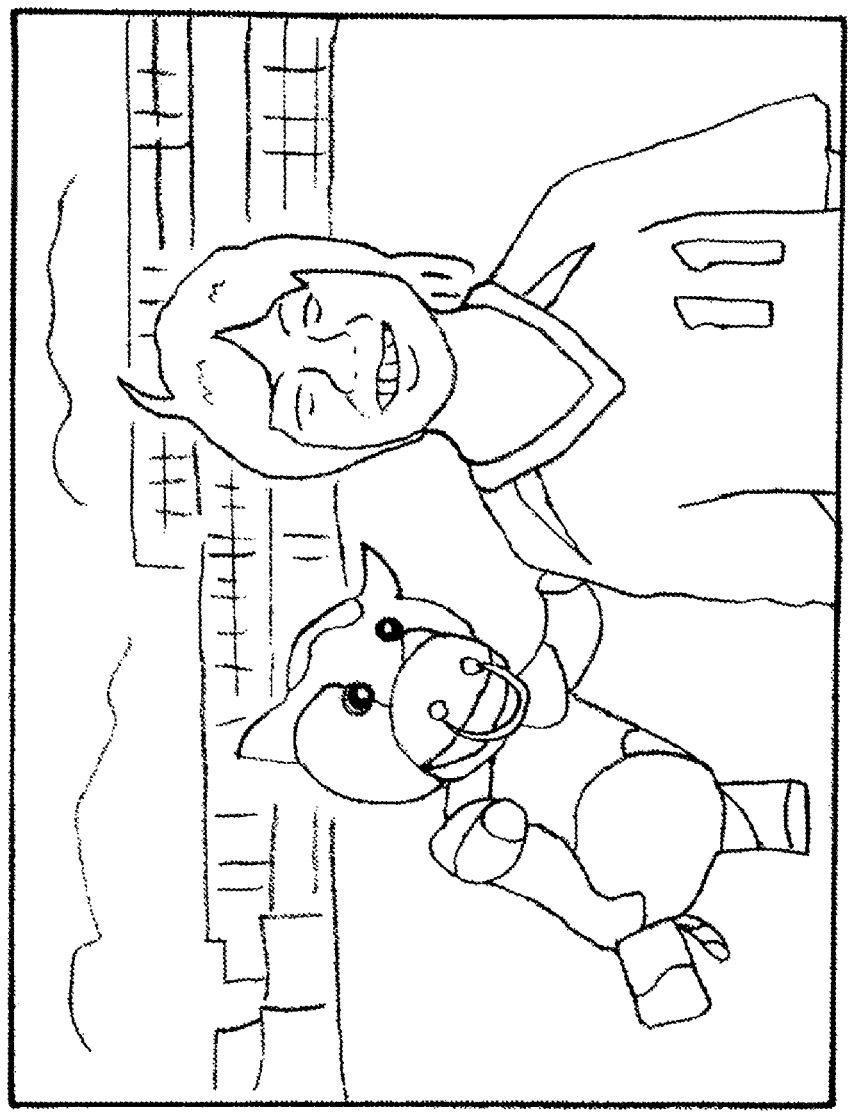
FIG. 7 is a diagram showing an example of an animation movie generated by the support and complement device 3 shown in FIG. 1.

Next, description below will be made with reference to FIG. 6 regarding the effects of the emotion. In FIG. 6, let us consider an arrangement in which, first, "standing up straight (at attention)" is selected as a default character's motion, facial expressions or other performance. Furthermore, let us say that the time scale from a motion selection step (1) (specification according to a given input specification command) to a motion selection step (7) (specification according to a subsequent different input specification command) is 10 seconds, and the effect of the emotion diminishes over time. The unit 43 for choosing commands is configured to perform its operation such that the motion determined in Step (1) has the maximum effect on the character's motion at the time point of the motion selection step (1), and the emotion effect diminishes over a time period of 10 seconds until the next specification command is input. Accordingly, at the time point of the motion selection step (7), with a time period of 9 seconds having elapsed from the time point of the motion selection step (1), the remaining emotion effect of the motion selected in Step (1) is on the order of 10%. That is to say, the unit 43 for choosing commands is configured to generate the motion command such that the time point at which the emotion pattern has transited to the next emotion pattern in the scenario data time scale and/or the time point at which the specification command has transited to the next specification command in the scenario data time scale is the time point at which the emotion level becomes highest, and such that the emotion level diminishes over time. As shown in FIG. 6, for example, this adjustment processing may be performed for each of the selection of the character's motion, the readout of the material data 31, the readout of the language data 29, and the readout of BGM data, so as to independently take into account the emotion effects. Furthermore, the support and complement device 3 shown in FIG. 1 includes a unit 44 of memory for correction input history (which is an example of the "unit of memory for correction input history" in the claims). The unit 44 of memory for correction input history stores the correction history which specifies how the user has taken into account the emotion patterns in the previous operations. The unit for choosing commands is configured to generate the motion command based on the preferences or choices of the user of the support and complement device 3 with reference to the correction input history. FIG. 7 is a diagram showing an example of an animation movie generated by the support and complement device 3 shown in FIG. 1.

Next, description below will be made with reference to FIGS. 8 through 10 regarding the distribution of an animation movie using the scenario data and the video data. A case will be described with reference to FIGS. 8 through 10 regarding an arrangement in which the user of the support and complement device 3 inputs the voice of the voiceover actor playing the character via a voice input device such as a microphone or the like as the voice for the language data 31 shown in FIG. 1.

Figure 8:
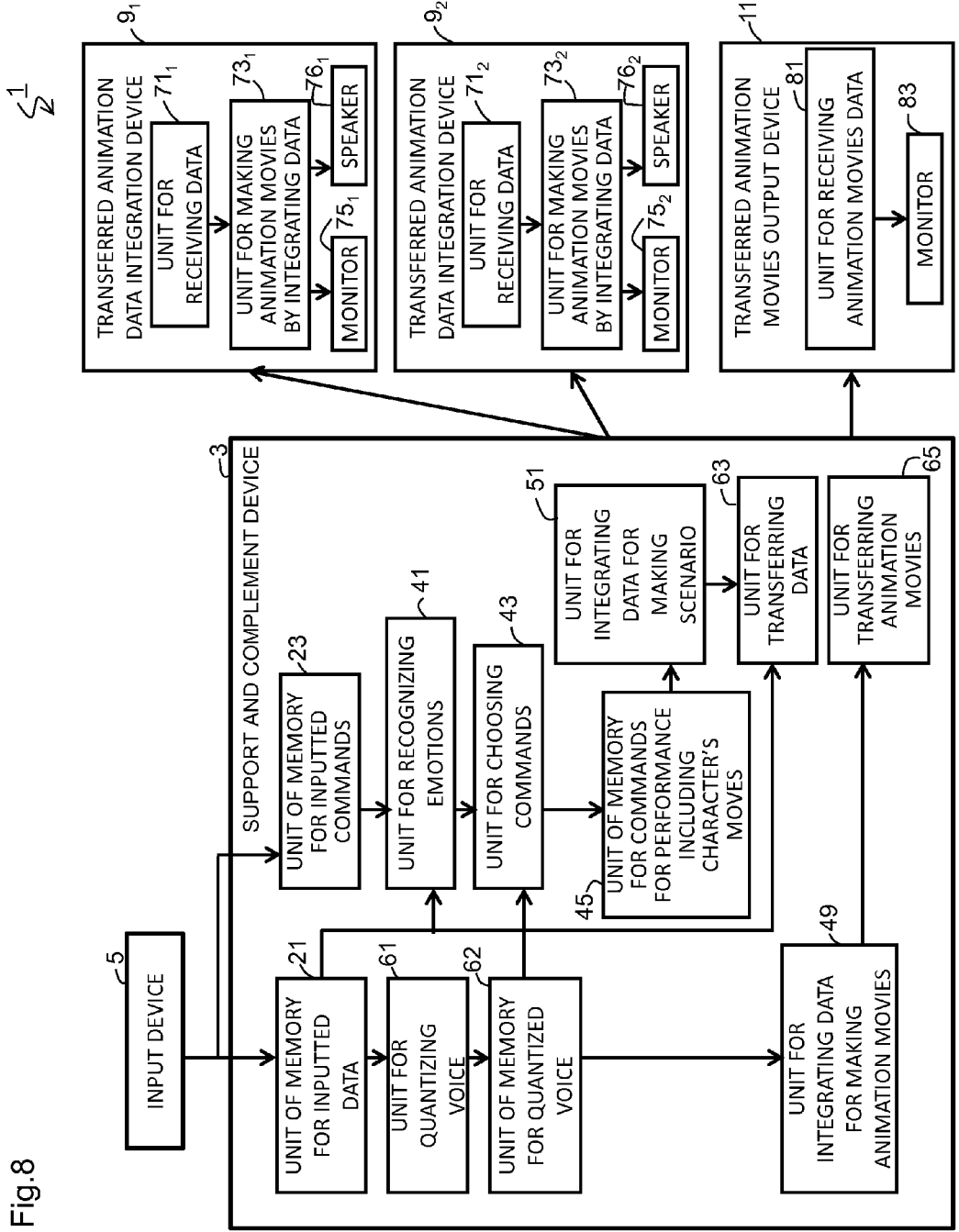
FIG. 8 is a schematic block diagram for describing the distribution of scenario data and video data generated by a unit 51 for integrating data for making scenario shown in FIG. 1.

With the system 1 for making animation movies shown in FIG. 8, in a case in which a content playback device is capable of performing a certain level of information processing, as with the transferred animation data integration device 9, the animation movie playback device performs various kinds of processing so as to play back the content. Such an arrangement allows the scenario data to be played back with attention to the receiving side. For example, such an arrangement provides a character with a motion that is suitable for the location of the content playback device. On the other hand, in a case in which the content playback device is configured as a terminal which has only a function of playing back a movie image, as with the transferred animation movies output device 11, the support and complement device generates the movie data, and the transferred animation movies output device 11 is instructed to play back the movie data thus generated. Such an arrangement allows the content to be introduced even if the content playback device does not have a sufficient processing capacity.

The system 1 for making animation movies shown in FIG. 1 includes two transferred animation data integration devices 9$_1$ and 9$_2$ (each of which is an example of the "transferred animation data integration device" in the claims) (in a case in which multiple devices are denoted by a single reference numeral, the indexes will be omitted hereafter), and a single transferred animation movies output device 11 (which is an example of the "transferred animation movies output device" in the claims). The number of the transferred animation data integration devices 9 is not restricted in particular. Also, the system 1 for making animation movies may include multiple transferred animation movies output devices 11.

Referring to FIG. 8, the support and complement device 3 includes a unit 61 for quantizing voice, a unit 62 of memory for quantized voice, a unit 63 for transferring data, and a unit 65 for transferring animation movies.

The unit 61 for quantizing voice is configured to divide the voice data of the language data 31 of the content, to extract a part of or otherwise the entire region of the voice data as a voice component, and to quantize the voice component thus extracted, thereby generating quantized data (the quantized data thus generated will be referred to as the "quantized data of voice and sound" hereafter). For example, the spoken line "Hisashiburine" (a Japanese phrase meaning "Long time no see" in English) to be emitted by the CG character is quantized on the basis of individual voice components "hi", "sa", "shi", "bu", "ri", and "ne" including pause components. The unit 62 of memory for quantized voice is configured to store each of the quantized data of voice and sound thus generated. The unit 43 for choosing commands is configured to perform frequency analysis of the quantized data of voice and sound stored in the unit 62 of memory for quantized voice. The analysis results are used for the generation of images. Furthermore, by analyzing the volume of the voice, the unit 43 for choosing commands determines the image of the character's mouth. The image of the character's mouth is stored separately from the other images in the unit 27 of memory for character pictures shown in FIG. 1.

The unit 63 for transferring data is configured to transmit the scenario data generated by the unit 51 for integrating data for making scenario and the content stored in the unit 21 of memory for inputted data to the transferred animation data integration device 9. FIG. 8 shows an arrangement in which the quantized data of voice and sound are transmitted instead of the voice data of the language data 31. Furthermore, when the transferred animation data integration device 9 stores its own character image locally, the transferred animation data integration device 9 is configured to synchronously play back the content and the character with a motion using the character image thus stored. When the transferred animation data integration device 9 does not store its own character image locally, the unit 63 for transferring data is configured to transmit the character's image stored in the unit 27 of memory for character pictures. The unit 65 for transferring animation movies is configured to transmit the movie data generated by the unit 49 for integrating data for making animation movies to the transferred animation movies output device 11.

The transferred animation data integration device 9 includes a unit 71 for receiving data configured to receive information transmitted from the unit 63 for transferring data, and a unit 73 for making animation movies by integrating data configured to synchronously play back the content and the character image so as to display an animation movie on a monitor 75, while letting each of the quantized data of voice and sound thus received play back on the speaker 76. The transferred animation movies output device 11 includes a unit 81 for receiving animation movies data configured to receive the movie data, and monitor 83 configured to play back the movie data thus received.

Figure 9:
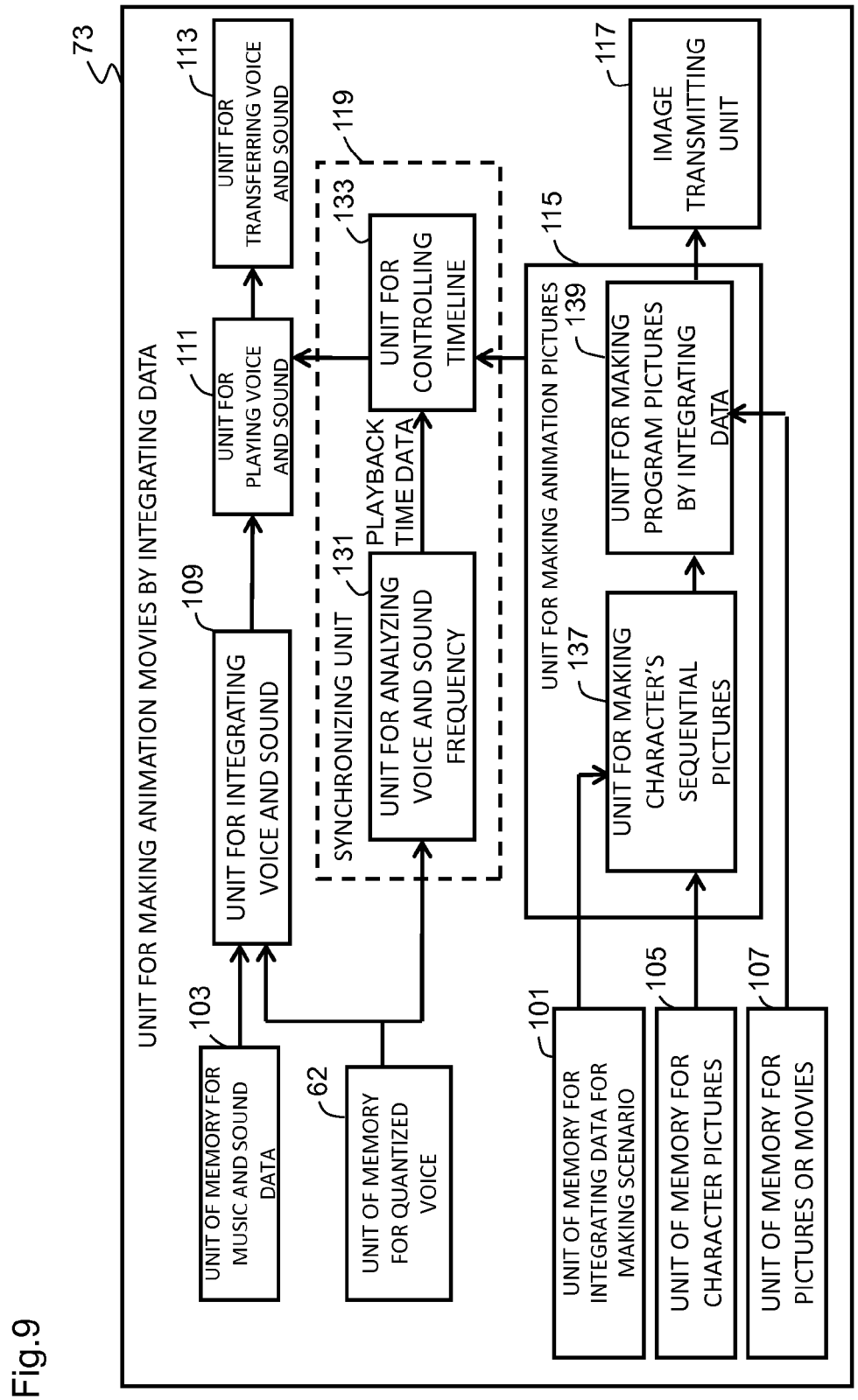
FIG. 9 is a schematic block diagram for describing a configuration and an operation of a unit 73 for making animation movies by integrating data shown in FIG. 8.

FIG. 9 is a schematic block diagram for describing a configuration and an operation of the unit 73 for making animation movies by integrating data shown in FIG. 8. The unit 73 for making animation movies by integrating data includes a unit 101 of memory for integrating data for making scenario, a unit 103 of memory for music and sound data, a unit 105 of memory for character pictures, and a unit 107 of memory for pictures or movies. The unit 101 of memory for integrating data for making scenario is configured to store the received scenario data. The unit 103 of memory for music and sound data is configured to store music material data. The unit 105 of memory for character pictures is configured to store the character image data. The unit 107 of memory for pictures or movies is configured to store image/video material data.

There may be a difference among the character images stored in the unit 105 of memory for character pictures by each of transferred animation data integration device 9. For example, an arrangement may be made in which a special kind of component image data (e.g., a kind of panda) is transmitted to the transferred animation data integration device $9_1$, and is not transmitted to the transferred animation data integration device $9_2$, etc., but rather a different kind of component image data (e.g., a kind of cat) is transmitted instead. Such a selection operation may be performed as follows. That is to say, such an arrangement may be configured to allow the user of the input device 5 to specify a particular transferred animation data integration device 9 only to which the support and complement device 5 transmits a special character image. Also, such an arrangement may be configured to allow the user of each transferred animation data integration device 9 to request such a special kind of character image to be transmitted. Such an arrangement allows the transferred animation data integration devices $9_1$ and $9_2$ to play back the same content with different character images. With conventional techniques, the distribution of an animation movie is performed in the form of a one-way flow of information. In contrast, such an arrangement according to the present invention allows the distribution operation for an animation movie to be adjusted to the location of the transferred animation data integration device 9, the time when the animation movie is played back, and so forth. Also, such a special character image may be prepared by each transferred animation data integration device 9.

First, description below will be made regarding a voice playback operation of the unit 73 for making animation movies by integrating data. The unit 73 for making animation movies by integrating data includes a unit 109 for integrating voice and sound, a unit 111 for playing voice and sound, and a unit 113 for transferring voice and sound. The unit 109 for integrating voice and sound is configured to integrate each quantized data of voice and sound and the music material data. The unit 111 for playing voice and sound is configured to play back the quantized data of voice and sound and the music material data thus integrated. The unit 113 for transferring voice and sound is configured to transmit the voice data to a speaker 76, thereby playing back the voice data.

Next, description will be made regarding an image display operation of a unit 115 for making animation pictures included in the unit 73 for making animation movies by integrating data. The unit 115 for making animation pictures includes a unit 137 for making character's sequential pictures, and a unit 139 for making program pictures by integrating data. The unit 137 for making character's sequential pictures is configured to generate an animated image of the character using the character's image by means of three-dimensional vector data processing, based on the scenario data. The unit 139 for making program pictures by integrating data is configured to combine the movie image of the character thus generated and the image/video material data, thereby generating program pictures.

In some cases, with regard to the quantized data of voice and sound, an image is displayed and the voice data is played back after the generation of the program pictures by means of the unit 115 for making animation pictures has been performed. With such an arrangement, the quantized data of voice and sound to be played back by the unit 111 for playing voice and sound differ from the quantized data of voice and sound to be used by the unit 115 for making animation pictures as the basis for the generation of the program pictures. Thus, the unit 73 for making animation movies by integrating data includes a synchronizing unit 119 configured to synchronize the playback operation of the unit 111 for playing voice and sound and the display of the program pictures provided by the unit 115 for making animation pictures. The synchronizing unit 119 includes a unit 131 for analyzing voice and sound frequency and a unit 133 for controlling timeline. The unit 131 for analyzing voice and sound frequency is configured to analyze the frequency of the quantized data of voice and sound to be played back by the unit 111 for playing voice and sound, so as to detect the playback time data. The unit 133 for controlling timeline is configured to compare the playback time data thus detected with the period of time required by the unit 115 for making animation pictures to generate the program pictures, so as to control the timing of the playback operation of the unit 111 for playing voice and sound.

Figure 10:
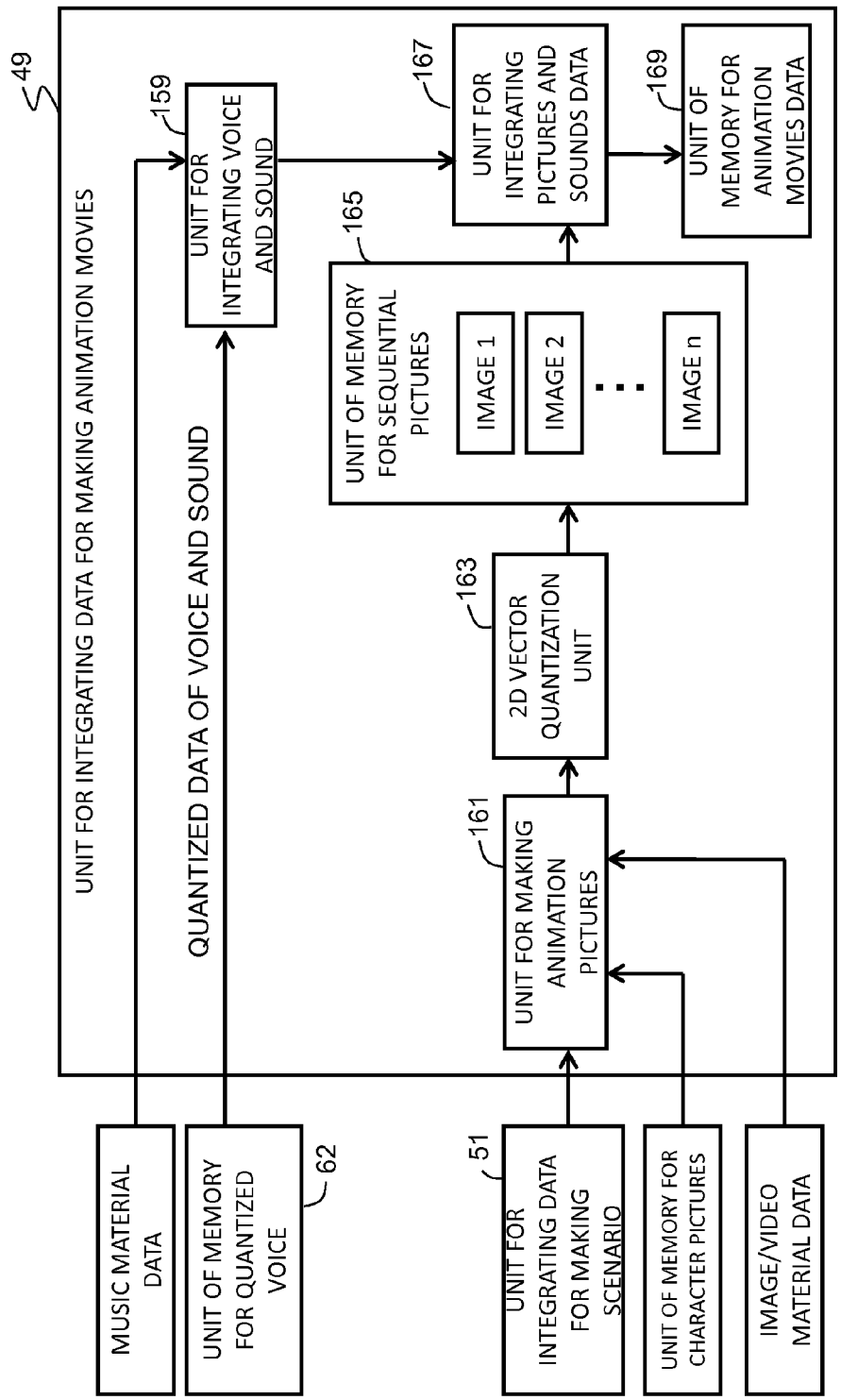
FIG. 10 is a schematic block diagram for describing a configuration and an operation of a unit 49 for integrating data for making animation movies shown in FIG. 8.

FIG. 10 is a schematic block diagram for describing a configuration and an operation of the unit 49 for integrating data for making animation movies shown in FIG. 8. The unit 49 for integrating data for making animation movies is configured to generate the movie data using the quantized data of voice and sound stored in the unit 62 of memory for quantized voice, the scenario data generated by the unit 51 for integrating data for making scenario, the image data of the character stored in the unit 27 of memory for character pictures, and the content stored in the unit 21 of memory for inputted data. The unit 49 for integrating data for making animation movies includes a unit 159 for integrating voice and sound, a unit 161 for making animation pictures, a 2D vector quantization unit 163, a unit 165 of memory for sequential pictures, a unit 167 for integrating pictures and sounds data, and a unit 169 of memory for animation movies data. The unit 159 for integrating voice and sound is configured to integrate each quantized data of voice and sound and the music material data. The unit 161 for making animation pictures is configured to generate program pictures (see the unit 115 for making animation pictures shown in FIG. 9). The 2D vector quantization unit 163 is configured to perform two-dimensional vector processing on the program pictures thus generated, so as to generate a series of images 1 through n in the form of successive images. The unit 165 of memory for sequential pictures is configured to store the successive images thus generated. The unit 167 for integrating pictures and sounds data is configured to combine the voice data integrated by the unit 159 for integrating voice and sound and the successive images, so as to generate the movie data. The unit 169 of memory for animation movies data is configured to store the movie data thus generated.

It should be noted that the transferred animation data integration device 9 is capable of playing back the movie data. Thus, an arrangement may also be configured to allow the movie data to be transmitted to the transferred animation data integration device 9 in addition to the transferred animation movies output device 11, according to an instruction from the user of the support and complement device 3 or otherwise an instruction from the user of the transferred animation data integration device 9. In a case in which the user of the support and complement device 3 desires to instruct multiple terminals to display the same animation movie, for example, such an arrangement allows the processing load of the transferred animation data integration device 9 to be reduced. It should be noted that, in a case in which the animation movie is transmitted in the form of movie data, in some cases, a great amount of data must be transmitted. In order to solve such a problem, an arrangement may be made configured to allow the unit 63 for transferring data and the unit 65 for transferring animation movies to automatically select a data transmission mode from among one mode in which the data is transmitted in the form of the scenario data or the like and the other mode in which the data is transmitted in the form of movie data according to the amount of data or the communication situation.

Also, the voice data may be quantized based on the input voice data as a unit of a series of voice components. For example, a phrase "Hisashiburine" (a Japanese phrase meaning "Long time no see" in English), from the time point at which the voice emission begins up to the time point at which there is a temporary pause could be as a unit of the voice data. Also, the voice data may be quantized as a unit of a predetermined period of time (e.g., 1/30 seconds or the like).

Furthermore, the unit 43 for choosing commands shown in FIG. 8 is capable of detecting the amplitude of the input voice data and of detecting the degree of opening of the character's mouth to be displayed, so as to generate the image of the character.

Such an arrangement allows an animation movie to be played back at remote locations. Thus, when there is a person in front of the transferred animation data integration device 9 or the like, for example, by inputting the phrase "Hisashiburine" (meaning "Long time no see") as the voice to be emitted by the CG character, such an arrangement allows the CG character with the spoken line "Hisashiburine" (meaning "Long time no see") to be displayed with the animation as if the CG character speaks on the transferred animation data integration device 9 or the like. This provides not only real-time delivery of content, but also content in a form which permits participation by the listeners and viewers. Moreover, this raises the degree of attention, the topicality, and the degree of recognition. Furthermore, such an arrangement configured to play back an animation movie associated with live filming images provides improved realism. Additionally, such an arrangement provides pseudo-conversation. Thus, such an arrangement provides content suitable for a situation such as personal instruction or the like.

Furthermore, in FIG. 1, only a small processing load is imposed on the input device 5 and the readout device 7. Thus, such devices may be provided by means of an Internet browser on the user side. For example, the user of the support and complement device 3 inputs the material data 29, the language data 31, and the specification command to the support and complement device 3 via a browser. By means of a web server, the support and complement device 3 can access the data thus input. The support and complement device 3 performs data processing using the material data and the like thus input, and displays the content in the user's browser. Here, the user-side device is not restricted in particular as long as it is capable of displaying a browser. Examples of such a user-side device include personal computers, smartphones, tablets, and so forth. Also, a browser configured to function as a device for displaying the content may be the same with or may be different from the browser for inputting the material data or the like. Also, an arrangement may be configured to allow the user to access different web servers and to acquire the character image to be stored in the unit 27 of memory for character pictures.

[Embodiment 2]

Description below will be made in the present embodiment regarding the expression of emotion patterns by multiple characters, and adjustment of the emotion patterns. That is to say, in a case in which a given character is instructed to perform a motion according to a given emotion pattern, the emotion patterns of the other characters are adjusted based on the aforementioned given emotion pattern. Such an emotion pattern thus adjusted based on a given emotion pattern of a different character will be referred to as an "emotion triggered by other's action pattern" hereafter.

To be understood easily, description below will be made in the present embodiment regarding a simple case in which two characters have a conversation with respect to a weekend movie. The first spoken line is, "This weekend, let's enjoy watching a movie". The second spoken line is, "The movie playing now is a very scary movie". The third spoken line is, "Maybe I'll change the plan to going shopping".

Figure 11:
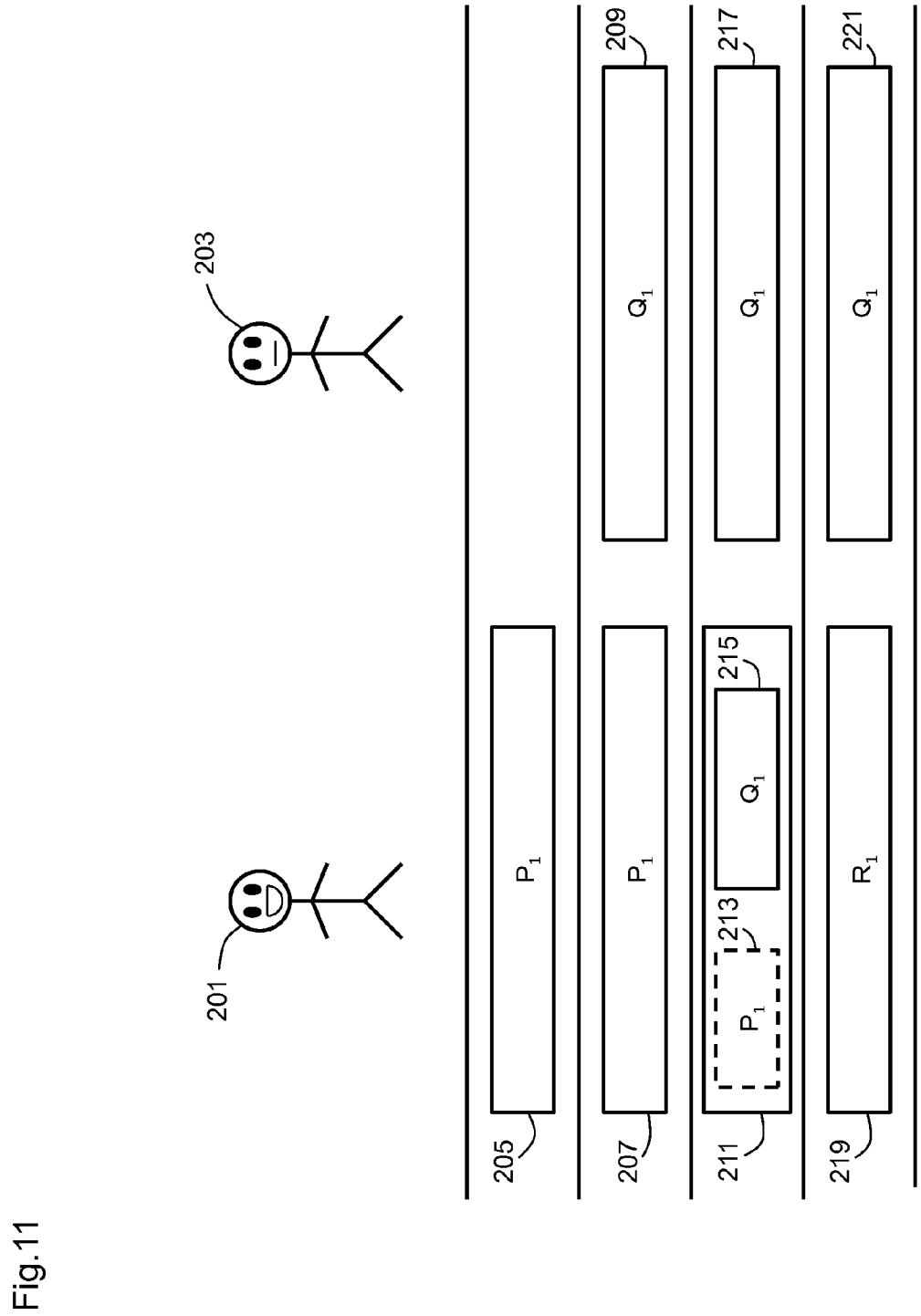
FIG. 11 is a diagram showing an example of the transition of the emotion triggered by other's action pattern in the conversation state according to an embodiment 2 of the present invention.

FIG. 11 is a diagram showing an example of the transition of the emotion triggered by other's action pattern in the conversation mode. In FIG. 11, two characters 201 and 203 have a conversation. The character 201 expresses the first spoken line and the third spoken line. The character 203 expresses the second spoken line.

The unit 41 for recognizing emotions shown in FIG. 1 extracts the emotion pattern "pleasure" (emotion pattern 205 (emotion pattern $P_1$)) from the first spoken line. The unit for choosing commands instructs the character 201 to express the emotion pattern "pleasure", and to emit the first spoken line. In this stage, such an arrangement instructs the character 203 to perform a default character's motion, facial expressions or other performance.

The unit 41 for recognizing emotions extracts the emotion pattern "fear" (emotion pattern 209 (emotion pattern $Q_1$)) from the second spoken line. The unit 43 for choosing commands instructs the character 203 to express the emotion pattern "fear", and to emit the second spoken line. The emotion pattern of the character 201 set to the emotion pattern $P_1$ is maintained at the time point when the character 203 starts to perform the motion. Thus, such an arrangement instructs the character 201 to perform a default character's motion, facial expressions or other performance based on the emotion pattern $P_1$. It should be noted that the emotion level diminishes as time elapses (emotion pattern 207 (emotion pattern $P_1$)).

After the character 203 starts to perform the motion, the unit 41 for recognizing emotions is configured to change the emotion pattern, and/or the emotion level of the character 201 based on the emotion pattern of the character 203. For example, when the emotion pattern of the character 203 is the same as that of the character 201, the emotion pattern of the character 201 is maintained, and the emotion level is elevated. When the emotion pattern of the character 203 differs from that of the character 201, the emotion pattern of the character 201 is changed. In this case, the emotion level of the character 201 may be adjusted according to the emotion level of the character 203.

In FIG. 11, the emotion pattern of the character 201 is set to "pleasure". The emotion pattern of the character 203 is set to "fear". That is to say, there is a difference in the emotion pattern between the characters 201 and 203. Accordingly, the unit 41 for recognizing emotions changes the emotion pattern 213 (emotion pattern $P_1$) using the emotion pattern 215 (emotion pattern $Q_1$). In FIG. 11, the unit 41 for recognizing emotions selects a new emotion pattern "perplexed" (emotion pattern 219 (emotion pattern $R_1$)). Subsequently, the unit 43 for choosing commands instructs the character 201 to express the emotion "perplexed", and to emit the third spoken line.

Figure 12:
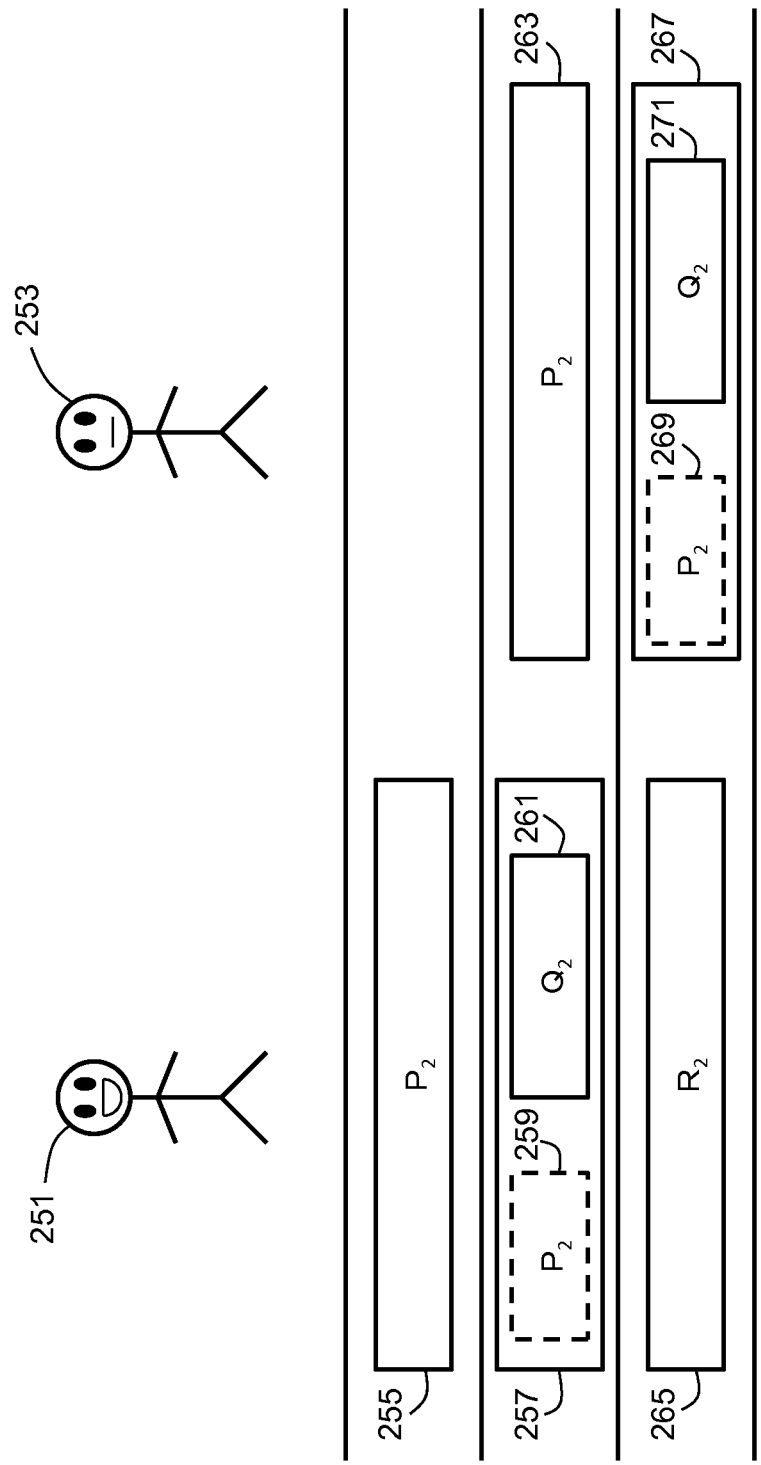
FIG. 12 is a diagram showing an example of the transition of the emotion triggered by other's action pattern in the listening state according to the embodiment 2 of the present invention.

FIG. 12 is a diagram showing an example of the transition of the emotion triggered by other's action in the listening state. In FIG. 11, the two characters 251 and 253 have a conversation. The character 251 expresses the first, second, and third spoken lines. The character 253 acts as a listener.

The unit 41 for recognizing emotions extracts the emotion pattern (emotion pattern 255 (emotion pattern $P_1$)) from the first spoken line. The unit 43 for choosing commands instructs the character 251 to express the emotion "pleasure", and to emit the first spoken line. In this stage, such an arrangement instructs the character 253 to perform a default character's motion, facial expressions or other performance.

After the character 251 starts to perform a motion, the unit 41 for recognizing emotions changes the emotion pattern and/or the emotion level of the character 253 using the emotion pattern and/or the emotion level of the character 251. In FIG. 12, the emotion pattern is adjusted according to the emotion pattern P2 (emotion pattern 263 (emotion pattern $P_2$)). Thus, the character 253 is instructed to perform a default character's motion, facial expressions or other performance based on the emotion pattern $P_2$.

The unit 41 for recognizing emotions extracts the emotion pattern "fear" (emotion pattern 261 (emotion pattern $Q_1$)) from the second spoken line. In this stage, the emotion pattern of the character 251 remains the emotion pattern $P_1$. However, the emotion level diminishes as time elapses (emotion pattern 259 (emotion pattern $P_1$)). In this case, there is a difference in the emotion pattern between the characters. Thus, the unit 43 for choosing commands instructs the character 251 to emit the second spoken line, and to express the emotion pattern $Q_2$ and the emotion pattern $P_2$, while diminishing the emotion level of the emotion pattern $P_2$ as time elapses.

After the character 251 starts to perform a motion for emitting the second spoken line, the unit 41 for recognizing emotions changes the emotion pattern $P_2$ (emotion pattern 269) of the character 253 using the emotion pattern $Q_2$ (emotion pattern 271). The unit 43 for choosing commands instructs the character 253 to perform a default character's motion, facial expressions or other performance based on the emotion pattern thus changed.

Such a new emotion pattern $Q_2$ thus extracted from the second spoken line differs from the emotion pattern of the character 251. Thus, the unit 41 for recognizing emotions extracts a new emotion pattern "perplexed" (emotion pattern 265 (emotion pattern $R_2$)). When the emotion pattern thus newly extracted from the second spoken line is the same as the emotion pattern of the character 251, the emotion pattern is maintained, and the emotion level is elevated, for example. The unit 43 for choosing commands instructs the character 253 to express the emotion pattern "perplexed", and to emit the third spoken line.

With the present embodiment, in a case in which there are multiple characters, when a given character performs a motion, the other characters perform a motion as if they were communicating with each other. That is to say, a character instructed to be perform a motion, acts as a speaker who communicates an expression. The other characters each act as a listener who listens to the expression. For example, when the emotion pattern of the speaker character is the same as that of the listener character, the emotion level is elevated, and along it the motion expressed by the listener character is updated. Conversely, when the emotion pattern of the speaker character differs from that of the listener character, a different emotion pattern is extracted, and along it the motion expressed by the listener character is updated. Such an arrangement allows the multiple characters to express emotion patterns in a unified manner. Such an arrangement allows the viewers and listeners to assimilate the expression of the listener character, and to watch the content with empathy for the listener character. Thus, such an arrangement provides a natural transmission of the emotion.

REFERENCE SIGNS LIST 1 system for making animation movies, 3 support and complement device, 5 input device, 7 readout device, 9 transferred animation data integration device, 11 transferred animation movies output device, 21 unit of memory for inputted data, 23 unit of memory for inputted commands, 25 unit of memory for facial expressions and poses, 27 unit of memory for character pictures, 29 material data, 31 language data, 41 unit for recognizing emotions, 43 unit for choosing commands, 44 unit of memory for correction input history, 45 unit of memory for commands for performance including character's moves, 47 unit for reading out animation movies for user's check, 49 unit for integrating data for making animation movies, 51 unit for integrating data for making scenario.

The invention claimed is:

1. A support and complement device for making animation movies comprises:
 a unit of memory for inputted commands which stores a specification command inputted, the specification command specifying a motion of a character other than a voice emission motion;
 a unit of memory for inputted data which stores language data;
 an emotion classification unit;
 a unit for choosing commands which generates a motion command which represents a motion of the character; and
 a unit for reading out the animation movies which instructs a readout device to play back the motion of the character specified by the motion command;
 wherein the unit of memory for inputted data stores material data;
 the emotion classification unit analyzes the specification command and deduces at least one basic emotion pattern from an analysis result of the specification command;
 the emotion classification unit analyzes the language data and deduces at least one basic emotion pattern from an analysis result of the language data;
 the emotion classification unit analyzes the material data and deduces at least one basic emotion pattern from an analysis result of the material data;
 the unit for choosing commands generates the motion command based on the at least one basic emotion pattern deduced from the specification command, the at least one basic emotion pattern deduced from the language data and the at least one basic emotion pattern deduced from the material data;
 the unit for reading out the animation movies instructs the readout device to play back, in a synchronized manner, the material data and the motion of the character specified by the motion command.

2. The support and complement device for making animation movies according to claim 1, wherein
 the material data includes at least one of image material data and video material data;
 the unit of memory for inputted data stores the at least one of image material data and video material data;
 the emotion classification unit analyzes the at least one of image material data and video material data and deduces at least one basic emotion pattern from an analysis result of the at least one of image material data and video material data;
 the unit for choosing commands generates the motion command based on the at least one basic emotion pattern deduced from the specification command, the at least one basic emotion pattern deduced from the language data and the at least one basic emotion pattern deduced from the at least one of image material data and video material data;
 the unit for reading out the animation movies instructs the readout device to play back, in a synchronized manner, the motion of the character specified by the motion command, and the at least one of image material data and video material data.

3. The support and complement device for making animation movies according to claim 1,
 when the emotion classification unit selects multiple basic emotion patterns, the emotion classification unit sets one of the multiple basic emotion patterns as a higher priority level and the unit for choosing commands generates the motion command that corresponds to the one of the multiple basic emotion patterns set as the higher priority level with a weighting ratio that is higher than other selected basic emotion patterns.

4. The support and complement device for making animation movies according to claim 1, wherein the unit for choosing commands generates the motion command based on the at least one basic emotion pattern deduced from the specification command, the at least one basic emotion pattern deduced from the language data and the at least one basic emotion pattern deduced from the material data with a corresponding weighting ratio in descending order of the specification command, the language data, and the material data.

5. The support and complement device for making movies according to claim 4, further comprising
 a unit of memory for correction input history configured to store a correction history which represents correction of the specification command performed in a previous step,
 wherein the unit for choosing commands generates the motion command also using the correction history.

6. The support and complement device for making animation movies according to claim 1,
 wherein the unit for choosing commands receives a command for permitting to rewrite motion,
 and when the command for permitting to rewrite the motion is an instruction to disable the rewriting function, the unit for choosing commands generates the motion command for a motion specified by the specification command,
 and when the command for permitting to rewrite the motion is an instruction to enable the rewriting function, the unit for choosing commands generates the motion command based on the at least one basic emotion pattern deduced from the specification command, the at least one basic emotion pattern deduced from the language data and the at least one basic emotion pattern deduced from the material data.

7. The support and complement device for making animation movies according to claim 1, further comprising;
 a unit of memory for facial expressions and poses which stores motion pattern of the character and illumination data corresponding to the basic emotion pattern;

wherein the unit for choosing commands further generates light effect data based on the basic emotion pattern and the illumination data.

8. The support and complement device for making animation movies according to claim 7, wherein the unit for choosing commands determines the illumination data based on the combination of the basic emotion pattern and its level.

9. The support and complement device for making animation movies according to claim 7,
wherein the unit for choosing commands generates the motion command according to an emotion level which exhibits its maximum level at a time point at which the motion pattern identified by the emotion classification unit transits to a next motion pattern in a scenario data time scale, and which decreases from its maximum level as time advances in the scenario data time scale.

10. The support and complement device for making animation movies according to claim 1,
wherein the unit for choosing commands generates the motion command according to an emotion level which exhibits its maximum level at a time point at which the specification command transits to a next inputted specification command in the scenario data time scale, and which decreases from its maximum level as time advances in the scenario data time scale.

11. The support and complement device for making animation movies according to claim 10, further comprising:
a unit for integrating data for making a scenario configured to generate scenario data including the motion command; and
a unit for integrating data for making animation movies configured to generate animation movie data by reading out the language data, the material data and the character's motion specified by the motion command in a synchronized manner,
and wherein a transferred animation data integration device is configured to receive the scenario data in addition to the language data, the material data and character pictures, and to play back, in a synchronized manner, the language data, the material data and the character's motion specified by the scenario data,
and wherein a transferred animation movies output device is configured to receive the animation movie data, and to play back the animation movie data thus received.

12. The support and complement device for making movies according to claim 1,
wherein a plurality of characters are employed,
and wherein, when at least one character is operated, the emotion classification unit is configured to rewrite the basic emotion patterns of the other characters and also or otherwise their levels based on the basic emotion pattern of the character thus operated.

13. A support and complement method for making animation movies used by a support and complement device,
wherein the support and complement device comprises;
a unit of memory for inputted commands which stores a specification command inputted, the specification command specifying a motion of a character other than a voice emission motion;
a unit of memory for inputted data which stores language data and material data;
an emotion classification unit;
a unit for choosing commands which generates a motion command which represents a motion of the character; and
a unit for reading out the animation movies which instructs a readout device to play back the motion of the character specified by the motion command;
and wherein the support and complement method comprises:
analyzing, by the emotion classification unit, the specification command and deducing at least one basic emotion pattern from an analysis result of the specification command;
analyzing, by the emotion classification unit, the language data and deducing at least one basic emotion pattern from an analysis result of the language data;
analyzing, by the emotion classification unit, the material data and deducing at least one basic emotion pattern from an analysis result of the material data;
generating, by the unit for choosing commands, the motion command based on the at least one basic emotion pattern deduced from the specification command, the at least one basic emotion pattern deduced from the language data and the at least one basic emotion pattern deduced from the material data; and
instructing, by the unit for reading out the animation movies, the readout device to play back, in a synchronized manner, the material data and the motion of the character specified by the motion command.

14. A non-transitory computer readable recording medium configured to record a computer program for instructing a computer to perform the support and complement method according to claim 13.

* * * * *